US011120138B2

(12) United States Patent
Rizos

(10) Patent No.: US 11,120,138 B2
(45) Date of Patent: *Sep. 14, 2021

(54) SECURE BOOTLOADER FOR ELECTRONIC GAMING MACHINES AND OTHER COMPUTING DEVICES

(71) Applicant: Aristocrat Technologies Australia Pty Limited, North Ryde (AU)

(72) Inventor: Thomas Rizos, Austin, TX (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 231 days.

This patent is subject to a terminal disclaimer.

(21) Appl. No.: 16/361,126

(22) Filed: Mar. 21, 2019

(65) Prior Publication Data

US 2020/0302062 A1   Sep. 24, 2020

(51) Int. Cl.
*G06F 21/57* (2013.01)
*G06F 9/4401* (2018.01)
*H04L 9/32* (2006.01)
*G07F 17/32* (2006.01)
*G07F 17/34* (2006.01)

(52) U.S. Cl.
CPC .......... *G06F 21/575* (2013.01); *G06F 9/4406* (2013.01); *G07F 17/3209* (2013.01); *G07F 17/3211* (2013.01); *G07F 17/3223* (2013.01); *G07F 17/3225* (2013.01); *G07F 17/3241* (2013.01); *G07F 17/3244* (2013.01); *H04L 9/3236* (2013.01); *G06F 2221/033* (2013.01); *G07F 17/329* (2013.01); *G07F 17/3213* (2013.01); *G07F 17/3293* (2013.01); *G07F 17/34* (2013.01)

(58) Field of Classification Search
CPC ............. G06F 21/575; G06F 2221/034; G06F 3/0622; G06F 3/0637; G06F 3/0683
See application file for complete search history.

(56) References Cited

U.S. PATENT DOCUMENTS 5,643,086 A   7/1997 Alcorn et al.
5,800,264 A   9/1998 Pascal et al.
(Continued)

FOREIGN PATENT DOCUMENTS

AU   2013205523 A1   5/2013

OTHER PUBLICATIONS

Office Action dated Jan. 7, 2021 for U.S. Appl. No. 16/361,124 (pp. 1-26).

*Primary Examiner* — Terrell S Johnson
(74) *Attorney, Agent, or Firm* — Weaver Austin Villeneuve & Sampson LLP

(57) ABSTRACT

Systems and techniques for providing one or more authenticable operating system volumes on an electronic gaming machine are provided. The systems and techniques may, for example, involve storing one or more datasets, each representing one or more operating system volumes for an operating system, on a shadow partition and then selecting one of those datasets as part of the boot process, authenticating it, and creating one or more operating system volumes on one or more operating system partitions of the electronic gaming machine. The systems and techniques may further involve causing a kernel of the operating system to execute from the newly created one or more operating system volumes only after authentication is successfully performed.

20 Claims, 7 Drawing Sheets

(56) References Cited

U.S. PATENT DOCUMENTS

| | | | |
|---|---|---|---|
| 6,106,396 A | 8/2000 | Allen et al. | |
| 6,149,522 A | 11/2000 | Alcorn et al. | |
| 6,287,202 B1 | 9/2001 | Pascal et al. | |
| 6,620,047 B1 | 9/2003 | Alcorn et al. | |
| 6,722,986 B1 | 4/2004 | Lyons et al. | |
| RE39,368 E | 10/2006 | Alcorn et al. | |
| RE39,369 E | 10/2006 | Alcorn et al. | |
| RE39,370 E | 10/2006 | Alcorn et al. | |
| RE39,400 E | 11/2006 | Alcorn et al. | |
| 7,398,310 B1* | 7/2008 | Kuehl | H04L 63/1416 709/224 |
| 8,579,705 B1 | 11/2013 | Bond | |
| 10,685,126 B2* | 6/2020 | Lang | G06F 3/0634 |
| 2002/0025842 A1 | 2/2002 | Alcorn et al. | |
| 2002/0028707 A1 | 3/2002 | Pascal et al. | |
| 2003/0069070 A1 | 4/2003 | Alcorn et al. | |
| 2003/0130041 A1 | 7/2003 | Pascal et al. | |
| 2004/0002381 A1 | 1/2004 | Alcorn et al. | |
| 2004/0248646 A1 | 12/2004 | Canterbury | |
| 2005/0014559 A1 | 1/2005 | Mattice et al. | |
| 2006/0100010 A1 | 5/2006 | Gatto et al. | |
| 2006/0247005 A1 | 11/2006 | Tanimura | |
| 2007/0129150 A1 | 6/2007 | Crowder et al. | |
| 2007/0129151 A1 | 6/2007 | Crowder et al. | |
| 2007/0130452 A1 | 6/2007 | Muir | |
| 2007/0150937 A1 | 6/2007 | Gatto et al. | |
| 2007/0191109 A1 | 8/2007 | Crowder et al. | |
| 2007/0287536 A1 | 12/2007 | Sharpless et al. | |
| 2008/0045342 A1 | 2/2008 | Crowder et al. | |
| 2008/0090652 A1 | 4/2008 | Kuehling et al. | |
| 2008/0090653 A1 | 4/2008 | Kuehling et al. | |
| 2008/0141017 A1 | 6/2008 | McCoull et al. | |
| 2008/0172557 A1 | 7/2008 | Crowder et al. | |
| 2008/0182656 A1 | 7/2008 | Crowder, Jr. | |
| 2008/0254850 A1 | 10/2008 | Sylla | |
| 2009/0005177 A1 | 1/2009 | Kishi et al. | |
| 2009/0013166 A1 | 1/2009 | Crowder, Jr. et al. | |
| 2009/0182995 A1 | 7/2009 | Muir | |
| 2009/0191961 A1 | 7/2009 | McCoull et al. | |
| 2009/0198805 A1* | 8/2009 | Ben-Shaul | G06F 9/4416 709/222 |
| 2009/0220078 A1 | 9/2009 | Campbell | |
| 2010/0048297 A1 | 2/2010 | Dasgupta | |
| 2010/0062844 A1 | 3/2010 | Crowder, Jr. et al. | |
| 2010/0130287 A1 | 5/2010 | Dasgupta | |
| 2010/0178977 A1 | 7/2010 | Kim et al. | |
| 2010/0203955 A1 | 8/2010 | Sylla | |
| 2010/0203960 A1 | 8/2010 | Wilson et al. | |
| 2011/0021270 A1 | 1/2011 | Morrow et al. | |
| 2011/0045902 A1 | 2/2011 | Sharpless et al. | |
| 2011/0078430 A1 | 3/2011 | McCoull et al. | |
| 2011/0117984 A1 | 5/2011 | Shimabukuro et al. | |
| 2011/0131401 A1 | 6/2011 | Singh et al. | |
| 2011/0183748 A1 | 7/2011 | Wilson et al. | |
| 2012/0064979 A1 | 3/2012 | Crowder, Jr. et al. | |
| 2012/0190441 A1 | 7/2012 | Crowder, Jr. | |
| 2012/0208619 A1 | 8/2012 | Canterbury et al. | |
| 2012/0208633 A1 | 8/2012 | Salzman | |
| 2012/0264508 A1 | 10/2012 | Sylla | |
| 2012/0272071 A1 | 10/2012 | Muir | |
| 2013/0059655 A1 | 3/2013 | Wasicek et al. | |
| 2013/0079153 A1 | 3/2013 | Crowder, Jr. et al. | |
| 2013/0185548 A1 | 7/2013 | Djabarov et al. | |
| 2013/0185563 A1 | 7/2013 | Djabarov et al. | |
| 2013/0210519 A1 | 8/2013 | Gatto et al. | |
| 2013/0263255 A1 | 10/2013 | Wolf | |
| 2013/0297925 A1 | 11/2013 | Singh et al. | |
| 2014/0011582 A1 | 1/2014 | Bond | |
| 2014/0075543 A1 | 3/2014 | Muir | |
| 2014/0087863 A1 | 3/2014 | Shimabukuro et al. | |
| 2014/0095857 A1 | 4/2014 | Djabarov et al. | |
| 2014/0108812 A1 | 4/2014 | Wolf | |
| 2014/0250299 A1 | 9/2014 | Kim et al. | |
| 2014/0256419 A1 | 9/2014 | Laputz et al. | |
| 2014/0274367 A1 | 9/2014 | Nguyen | |
| 2014/0298032 A1 | 10/2014 | Crowder, Jr. | |
| 2014/0317614 A1 | 10/2014 | Djabarov et al. | |
| 2015/0187173 A1 | 7/2015 | Oberberger | |
| 2015/0187174 A1 | 7/2015 | Oberberger | |
| 2015/0371495 A1 | 12/2015 | Salzman | |
| 2016/0089607 A1 | 3/2016 | Ike et al. | |
| 2016/0117166 A1 | 4/2016 | Djabarov et al. | |
| 2016/0306961 A1* | 10/2016 | Suryanarayana | G06F 21/44 |
| 2016/0342795 A1 | 11/2016 | Sharpless et al. | |
| 2017/0243007 A1 | 8/2017 | Djabarov et al. | |
| 2018/0065043 A1 | 3/2018 | Nguyen | |
| 2018/0204008 A1 | 7/2018 | Djabarov et al. | |
| 2019/0228108 A1* | 7/2019 | Gould | G06F 17/18 |
| 2020/0302061 A1* | 9/2020 | Rizos | G06F 3/0622 |

* cited by examiner

SECURE BOOTLOADER FOR ELECTRONIC GAMING MACHINES AND OTHER COMPUTING DEVICES

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

A secure bootloader for electronic gaming machines and other computing devices is provided in which one or more digitally signed datasets that each represent one or more operating system volumes are stored on a shadow partition or other location accessible to the secure bootloader. When the secure bootloader is executed to provide a secure boot process, the secure bootloader may select one of the datasets and create one or more corresponding operating system volumes on a corresponding one or more operating system partitions and may also authenticate the selected dataset by verifying its digital signature. If the selected dataset is authenticated, then the secure bootloader may cause an operating system kernel stored in one of the newly-created operating system volumes to be executed, thereby initiating the execution of the operating system.

Such a system and/or technique provides particular benefits with respect to some modern operating systems, such as Microsoft® Windows 10®, which may, during normal operation, routinely modify portions of the operating system volumes (or any other volumes that it recognizes as being of a file system type that it utilizes) in a way that causes such operating system volumes to no longer be authenticable against a reference version of those operating system volumes; such operating systems may make such modifications even if such volumes are defined in a way that ostensibly prevents such operating systems from writing to them. Such modifications do not affect the files within the file system, but do cause the dataset representing the file system as a whole to change slightly, thereby causing the authentication of such a dataset to fail. By completely replacing the operating system volume or volumes during every secure boot, the secure bootloaders discussed herein essentially overwrite whatever modifications to the operating system volume or volumes may have been caused by the operating system after the most recent previous boot.

The secure bootloaders described herein allow such modern operating systems to be used in electronic gaming systems and other types of computing devices without risk of an authentication failure of the operating system. Previously, older operating systems needed to be used which did not offer the advanced features of newer operating systems, but which also could be configured such that the operating system volumes remained completely unchanged during operation of the operating system.

The disclosure herein relates to the implementations discussed above, the further implementations discussed below, and various other implementations that will be evident from the discussion herein. In addition to such implementations, the following additional implementations are also considered to be within the scope of this disclosure, although such implementations should not be viewed as being limited thereto.

In some implementations, an apparatus is provided that includes one or more processors, one or more memory devices, and one or more non-volatile storage devices. In such an apparatus, the one or more non-volatile storage devices may, collectively, be partitioned into a plurality of logical disk partitions, the plurality of logical disk partitions may at least include: (a) one or more operating system partitions and (b) one or more shadow partitions, the one or more shadow partitions may collectively store one or more operating system datasets, each operating system dataset may represent a corresponding set of one or more operating system volumes, the one or more non-volatile storage devices may further store a secure bootloader that is configured to execute in one or more boot modes, the one or more boot modes may include at least a secure boot mode, and the secure bootloader may be configured to, when the secure bootloader is executed in the secure boot mode, cause the one or more processors to: a) select a first operating system dataset of the one or more operating system datasets, wherein the first operating system dataset represents a corresponding first set of one or more operating system volumes, b) obtain a corresponding one or more reference hash values for the first operating system dataset, c) authenticate the first operating system dataset using the one or more corresponding reference hash values, d) create, using the first operating system dataset, each operating system volume in the first set of one or more operating system volumes on a corresponding one of the one or more operating system partitions, and e) cause a kernel of a first operating system to be loaded into the one or more memory devices from at least one operating system volume of the first set of one or more operating system volumes and to be executed by the one or more processors responsive, at least in part, to a successful authentication of the first operating system dataset in (c) and after each operating system volume in the first set of one or more operating system volumes is created on the corresponding operating system partition of the one or more operating system partitions in (d).

In some implementations of the apparatus, the secure bootloader may be further configured to execute in only the secure boot mode and there may be no other boot modes that the secure bootloader is configured to execute.

In some implementations of the apparatus, the apparatus may further include one or more displays, a credit input device, and one or more player-input devices. In such implementations, the one or more displays, the credit input device, and the one or more player-input devices may be operably connected with the one or more processors and the one or more memory devices, and the one or more non-volatile storage devices may further store instructions for controlling the one or more processors to cause a wagering game to be displayed on the one or more displays after the kernel of the first operating system is executed.

In some implementations of the apparatus, the one or more corresponding reference hash values in (b) may result from hashing a reference version of the first operating system dataset according to a first set of one or more hashing operations, and the secure bootloader may be further configured to, when the secure bootloader is executed in the secure boot mode, cause the one or more processors to: obtain the corresponding one or more reference hash values in (b) in an encrypted state and authenticate the first operating system dataset using the one or more corresponding reference hash values in (c) by: decrypting the corresponding one or more reference hash values from the encrypted state to obtain that corresponding one or more reference hash values, obtaining one or more corresponding test hash values by hashing the first operating system dataset according to the first set of one or more hashing operations, and determining, based on the one or more test hash values and the corresponding reference hash values, that the first operating system dataset matches the reference version of the first operating system dataset.

In some implementations of the apparatus, the first operating system dataset may include one or more first portions, each first portion corresponding to a different one of the one of the one or more operating system volumes that the first operating system dataset represents, the reference version of the first operating system dataset may include one or more first reference portions, each first reference portion corresponding to one of the first portions, the first operating system dataset may be a byte-for-byte copy of the reference version of the first operating system dataset except that one or more bytes of the first N−1 bytes of each first portion differs from one or more bytes of the first N−1 bytes of each corresponding first reference portion, and the secure bootloader may be further configured to cause, prior to or during (c) or (d), the one or more processors to adjust the first N−1 bytes of each first portion to match the first N−1 bytes of the corresponding first reference portion such that the authentication in (c) takes into account the adjusted first N−1 bytes of each first portion.

In some such implementations of the apparatus, at least one operating system volume in the first set of one or more operating system volumes may be formatted such that the first N−1 bytes of that operating system volume indicate that that operating system volume is formatted as a Microsoft® New Technology File System (NTFS®) volume and the first N−1 bytes of the first portion corresponding to that operating system volume may not indicate formatting as a Microsoft® NTFS® volume. In some such implementations of the apparatus, N may equal 5.

In some implementations of the apparatus, the secure bootloader may be further configured to cause the one or more processors to cause, as part of (d), the adjusted first N−1 bytes of each first portion and then the Nth byte through the last byte of that first portion to be serially copied byte-for-byte to a corresponding one of the one or more operating system partitions and to incrementally generate incremental test hash values based on the copied data.

In some further such implementations of the apparatus, the secure bootloader may be further configured to cause the one or more processors to: obtain one or more incremental reference hash values, each incremental reference hash value corresponding to one of the one or more incremental test hash values and resulting from hashing a portion of the reference version of the first operating system dataset corresponding with the copied data used to generate the corresponding incremental test hash value, compare each incremental reference hash value to the corresponding incremental test hash value, and generate an error condition if any one of the one or more incremental reference hash values does and the corresponding incremental test hash value of the one or more incremental test hash values indicates an authentication failure.

In some implementations of the apparatus, each of the corresponding one or more reference hash values may be encrypted using a private key of a corresponding public/private key pair and the secure bootloader is further configured to cause each of the one or more corresponding reference hash values to be decrypted with the corresponding public key of the corresponding public/private key pair.

In some implementations of the apparatus, there may be a plurality of operating system datasets collectively stored on the one or more shadow partitions, each operating system dataset may be associated with data indicating a date associated with that operating system dataset, and the secure bootloader may be further configured to select, in (a), the operating system dataset associated with the most recent date as the first operating system dataset.

In some implementations of the apparatus, there may be a plurality of operating system datasets collectively stored on the one or more shadow partitions, each operating system dataset may be associated with data indicating a date associated with that operating system dataset, and the secure bootloader may be further configured to, when the secure bootloader is executed in the secure boot mode, cause the one or more processors to: select the first operating system dataset in (a) after unsuccessfully attempting one or more times to authenticate one or more other operating system datasets of the plurality of operating system datasets that are each, based on the date associated with each of the one or more other operating system datasets, newer than the first operating system dataset, and attempt to authenticate, at least until one of the operating system datasets is successfully authenticated, each of the one or more other operating system datasets of the plurality of operating system datasets using one or more corresponding reference hash values for that operating system dataset and in a reverse chronological order based on the dates associated with each other operating system dataset of the one or more other operating system datasets.

In some implementations of the apparatus, the one or more shadow partitions may be designated in one or more partition tables of the one or more non-volatile storage devices as being a partition type that is an unallocated partition type for the first operating system.

In some implementations of the apparatus, the one or more shadow partitions may be designated in one or more partition tables of the one or more non-volatile storage devices as being hidden partitions that are not visible to a file system of the first operating system.

In some implementations of the apparatus, the one or more operating system datasets may include at least one operating system dataset that represents one or more operating system volumes for a version of Microsoft® Windows®.

In some implementations of the apparatus, the one or more operating system datasets may include at least one operating system dataset that represents one or more operating system volumes for Microsoft® Windows 10®.

In some implementations of the apparatus, the one or more storage devices may further store one or more computer-executable instructions that are further configured to be executable by the kernel of the first operating system and that are configured to cause the one or more processors to: obtain an additional operating system dataset representing an additional corresponding one or more operating system volumes via a network connection, obtain a corresponding one or more additional reference hash values for the additional operating system dataset, and store the additional operating system dataset in the one or more shadow partitions.

In some implementations, a method may be provided that includes a) selecting, by one or more processors of an apparatus and during execution of a secure bootloader for the apparatus, a first operating system dataset of one or more operating system datasets collectively stored on one or more shadow partitions of a plurality of logical disk partitions of one or more non-volatile storage devices, the plurality of logical disk partitions also including one or more operating system partitions. Each operating system dataset may represent a corresponding set of one or more operating system volumes and the first operating system dataset may represents a corresponding first set of one or more operating system volumes. The method may further include b) obtaining, by the one or more processors, a corresponding one or more reference hash values for the first operating system dataset, c) authenticating, by the one or more processors, the first operating system dataset using the one or more corresponding reference hash values, d) creating, by the one or more processors and using the first operating system dataset, each operating system volume in the first set of one or more operating system volumes on a corresponding one of the one or more operating system partitions, and e) causing, by the one or more processors, a kernel of a first operating system to be loaded into the one or more memory devices from at least one operating system volume of the first set of one or more operating system volumes and to be executed by the one or more processors responsive, at least in part, to a successful authentication of the first operating system dataset in (c) and after each operating system volume in the first set of one or more operating system volumes is created on the corresponding operating system partition of the one or more operating system partitions in (d).

In some implementations, the secure bootloader may be configured to perform (a) through (e) for every boot of the apparatus.

In some implementations of the method, the method may further include causing, by the one or more processors, a wagering game to be displayed on one or more displays of the apparatus after the kernel of the first operating system is executed.

In some implementations of the method, the one or more corresponding reference hash values in (b) may result from hashing a reference version of the first operating system dataset according to a first set of one or more hashing operations, and the method may further include obtaining the corresponding one or more reference hash values in (b) in an encrypted state and authenticating the first operating system dataset using the one or more corresponding reference hash values in (c) by: decrypting the corresponding one or more reference hash values from the encrypted state to obtain that corresponding one or more reference hash values, obtaining one or more corresponding test hash values by hashing the first operating system dataset according to the first set of one or more hashing operations, and determining, based on the one or more test hash values and the corresponding reference hash values, that the first operating system dataset matches the reference version of the first operating system dataset.

In some implementations of the method, the first operating system dataset may include one or more first portions, each first portion corresponding to a different one of the one of the one or more operating system volumes that the first operating system dataset represents, the reference version of the first operating system dataset may include one or more first reference portions, each first reference portion corresponding to one of the first portions, the first operating system dataset may be a byte-for-byte copy of the reference version of the first operating system dataset except that one or more bytes of the first N−1 bytes of each first portion differs from one or more bytes of the first N−1 bytes of each corresponding first reference portion, and the method may further include causing, prior to or during (c) or (d), the one or more processors to adjust the first N−1 bytes of each first portion to match the first N−1 bytes of the corresponding first reference portion such that the authentication in (c) takes into account the adjusted first N−1 bytes of each first portion.

In some implementations of the method, at least one operating system volume in the first set of one or more operating system volumes may be formatted such that the first N−1 bytes of that operating system volume indicate that that operating system volume is formatted as a Microsoft® New Technology File System (NTFS®) volume and the first N−1 bytes of the first portion corresponding to that operating system volume may not indicate formatting as a Microsoft® NTFS® volume. In some such implementations of the method, N may equal 5.

In some implementations of the method, the method may further include causing the one or more processors to cause, as part of (d), the adjusted first N−1 bytes of each first portion and then the Nth byte through the last byte of that first portion to be serially copied byte-for-byte to a corresponding one of the one or more operating system partitions and to incrementally generate incremental test hash values based on the copied data.

In some implementations of the method, the method may further include obtaining one or more incremental reference hash values, each incremental reference hash value corresponding to one of the one or more incremental test hash values and resulting from hashing a portion of the reference version of the first operating system dataset corresponding with the copied data used to generate the corresponding incremental test hash value, comparing each incremental reference hash value to the corresponding incremental test hash value, and generating an error condition if any one of the one or more incremental reference hash values does and the corresponding incremental test hash value of the one or more incremental test hash values indicates an authentication failure.

In some implementations of the method each of the corresponding one or more reference hash values may be encrypted using a private key of a corresponding public/private key pair and the method may further include causing the one or more processors to decrypt each of the one or more corresponding reference hash values with the corresponding public key of the corresponding public/private key pair.

In some implementations of the method, there may be a plurality of operating system datasets collectively stored on the one or more shadow partitions, each operating system dataset may be associated with data indicating a date associated with that operating system dataset, and the method may further include causing the one or more processors to select, in (a), the operating system dataset associated with the most recent date as the first operating system dataset.

In some implementations of the method, there may be a plurality of operating system datasets collectively stored on the one or more shadow partitions, each operating system dataset may be associated with data indicating a date associated with that operating system dataset, and the method may further include causing the one or more processors to: select the first operating system dataset in (a) after unsuccessfully attempting one or more times to authenticate one or more other operating system datasets of the plurality of operating system datasets that are each, based on the date associated with each of the one or more other operating system datasets, newer than the first operating system dataset, and attempt to authenticate each of the one or more other operating system datasets of the plurality of operating system datasets using one or more corresponding reference hash values for that operating system dataset and in a reverse chronological order based on the dates associated with each other operating system dataset of the one or more other operating system datasets at least until one of the operating system datasets is successfully authenticated.

In some implementations of the method, the one or more shadow partitions may be designated in one or more partition tables of the one or more non-volatile storage devices as being a partition type that is an unallocated partition type for the first operating system.

In some implementations of the method, the one or more shadow partitions may be designated in one or more partition tables of the one or more non-volatile storage devices as being hidden partitions that are not visible to a file system of the first operating system.

In some implementations of the method, the one or more operating system datasets may include at least one operating system dataset that represents one or more operating system volumes for a version of Microsoft® Windows®.

In some implementations of the method, the one or more operating system datasets may include at least one operating system dataset that represents one or more operating system volumes for Microsoft® Windows 10®.

In some implementations of the method, the method may further include causing the one or more processors to: obtain an additional operating system dataset representing an additional corresponding one or more operating system volumes via a network connection, obtain a corresponding one or more additional reference hash values for the additional operating system dataset, and store the additional operating system dataset in the one or more shadow partitions.

In some implementations, a non-transitory, machine-readable storage medium may be provided that stores machine-readable instructions for a secure bootloader which, when executed by one or more processors of an apparatus having one or more memory devices and one or more non-volatile storage devices, cause the one or more processors to: a) select a first operating system dataset of the one or more operating system datasets collectively stored on one or more shadow partitions of a plurality of logical disk partitions of the one or more non-volatile storage devices, the plurality of logical disk partitions also including one or more operating system partitions, wherein each operating system dataset represents a corresponding set of one or more operating system volumes and the first operating system dataset represents a corresponding first set of one or more operating system volumes, wherein the first operating system dataset represents a corresponding first set of one or more operating system volumes, b) obtain a corresponding one or more reference hash values for the first operating system dataset, c) authenticate the first operating system dataset using the one or more corresponding reference hash values, d) create, using the first operating system dataset, each operating system volume in the first set of one or more operating system volumes on a corresponding one of the one or more operating system partitions, and e) cause a kernel of a first operating system to be loaded into the one or more memory devices from at least one operating system volume of the first set of one or more operating system volumes and to be executed by the one or more processors responsive, at least in part, to a successful authentication of the first operating system dataset in (c) and after each operating system volume in the first set of one or more operating system volumes is created on the corresponding operating system partition of the one or more operating system partitions in (d).

In some implementations of the non-transitory, machine-readable storage medium, the secure bootloader may be further configured to execute in only the secure boot mode and there may be no other boot modes that the secure bootloader is configured to execute.

In some implementations of the non-transitory, machine-readable storage medium the non-transitory, machine-readable storage medium may further store further machine-readable instructions for the secure bootloader which, when executed by the one or more processors, cause the one or more processors to cause a wagering game to be displayed on one or more displays after the kernel of the first operating system is executed.

In some implementations of the non-transitory, machine-readable storage medium, the one or more corresponding reference hash values in (b) may result from hashing a reference version of the first operating system dataset according to a first set of one or more hashing operations, and the non-transitory, machine-readable storage medium may further store further machine-readable instructions for the secure bootloader which, when executed by the one or more processors, cause the one or more processors to: obtain the corresponding one or more reference hash values in (b) in an encrypted state and authenticate the first operating system dataset using the one or more corresponding reference hash values in (c) by: decrypting the corresponding one or more reference hash values from the encrypted state to obtain that corresponding one or more reference hash values, obtaining one or more corresponding test hash values by hashing the first operating system dataset according to the first set of one or more hashing operations, and determining, based on the one or more test hash values and the corresponding reference hash values, that the first operating system dataset matches the reference version of the first operating system dataset.

In some implementations of the non-transitory, machine-readable storage medium, the first operating system dataset may include one or more first portions, each first portion corresponding to a different one of the one of the one or more operating system volumes that the first operating system dataset represents, the reference version of the first operating system dataset may include one or more first reference portions, each first reference portion corresponding to one of the first portions, the first operating system dataset may be a byte-for-byte copy of the reference version of the first operating system dataset except that one or more bytes of the first N−1 bytes of each first portion differs from one or more bytes of the first N−1 bytes of each corresponding first reference portion, and the non-transitory, machine-readable storage medium may further store further machine-readable instructions for the secure bootloader which, when executed by the one or more processors, cause the one or more processors to, prior to or during (c) or (d), to adjust the first N−1 bytes of each first portion to match the first N−1 bytes of the corresponding first reference portion such that the authentication in (c) takes into account the adjusted first N−1 bytes of each first portion.

In some implementations of the non-transitory, machine-readable storage medium, at least one operating system volume in the first set of one or more operating system volumes may be formatted such that the first N−1 bytes of that operating system volume indicate that that operating system volume is formatted as a Microsoft® New Technology File System (NTFS®) volume and the first N−1 bytes of the first portion corresponding to that operating system volume may not indicate formatting as a Microsoft® NTFS® volume.

In some implementations of the non-transitory, machine-readable storage medium, N may equal 5.

In some implementations of the non-transitory, machine-readable storage medium, the non-transitory, machine-readable storage medium may further store further machine-readable instructions for the secure bootloader which, when executed by the one or more processors, cause the one or more processors to, as part of (d), serially copy the adjusted first N−1 bytes of each first portion and then the Nth byte through the last byte of that first portion byte-for-byte to a corresponding one of the one or more operating system partitions and to incrementally generate incremental test hash values based on the copied data.

In some implementations of the non-transitory, machine-readable storage medium, the non-transitory, machine-readable storage medium may further store further machine-readable instructions for the secure bootloader which, when executed by the one or more processors, cause the one or more processors to: obtain one or more incremental reference hash values, each incremental reference hash value corresponding to one of the one or more incremental test hash values and resulting from hashing a portion of the reference version of the first operating system dataset corresponding with the copied data used to generate the corresponding incremental test hash value, compare each incremental reference hash value to the corresponding incremental test hash value, and generate an error condition if any one of the one or more incremental reference hash values does and the corresponding incremental test hash value of the one or more incremental test hash values indicates an authentication failure.

In some implementations of the non-transitory, machine-readable storage medium, each of the corresponding one or more reference hash values may be encrypted using a private key of a corresponding public/private key pair, and the non-transitory, machine-readable storage medium may further store further machine-readable instructions for the secure bootloader which, when executed by the one or more processors, cause the one or more processors to decrypt each of the one or more corresponding reference hash values with the corresponding public key of the corresponding public/private key pair.

In some implementations of the non-transitory, machine-readable storage medium, there may be a plurality of operating system datasets collectively stored on the one or more shadow partitions, each operating system dataset may be associated with data indicating a date associated with that operating system dataset, and the non-transitory, machine-readable storage medium may further store further machine-readable instructions for the secure bootloader which, when executed by the one or more processors, cause the one or more processors to select, in (a), the operating system dataset associated with the most recent date as the first operating system dataset.

In some implementations of the non-transitory, machine-readable storage medium, there may be a plurality of operating system datasets collectively stored on the one or more shadow partitions, each operating system dataset is associated with data indicating a date associated with that operating system dataset, and the non-transitory, machine-readable storage medium may further store further machine-readable instructions for the secure bootloader which, when executed by the one or more processors, cause the one or more processors to: select the first operating system dataset in (a) after unsuccessfully attempting one or more times to authenticate one or more other operating system datasets of the plurality of operating system datasets that are each, based on the date associated with each of the one or more other operating system datasets, newer than the first operating system dataset, and attempt to authenticate each of the one or more other operating system datasets of the plurality of operating system datasets using one or more corresponding reference hash values for that operating system dataset and in a reverse chronological order based on the dates associated with each other operating system dataset of the one or more other operating system datasets.

In some implementations of the non-transitory, machine-readable storage medium, the one or more shadow partitions may be designated in one or more partition tables of the one or more non-volatile storage devices as being a partition type that is an unallocated partition type for the first operating system.

In some implementations of the non-transitory, machine-readable storage medium, the one or more shadow partitions may be designated in one or more partition tables of the one or more non-volatile storage devices as being hidden partitions that are not visible to a file system of the first operating system.

In some implementations of the non-transitory, machine-readable storage medium, the one or more operating system datasets may include at least one operating system dataset that represents one or more operating system volumes for a version of Microsoft® Windows®.

In some implementations of the non-transitory, machine-readable storage medium, the one or more operating system datasets may include at least one operating system dataset that represents one or more operating system volumes for Microsoft® Windows 10®.

In some implementations of the non-transitory, machine-readable storage medium, the non-transitory, machine-readable storage medium may further store further machine-readable instructions that are executable by the kernel of the first operating system to cause the one or more processors to: obtain an additional operating system dataset representing an additional corresponding one or more operating system volumes via a network connection, obtain a corresponding one or more additional reference hash values for the additional operating system dataset, and store the additional operating system dataset in the one or more shadow partitions.

In some implementations, an apparatus may be provided that includes one or more processors, one or more memory devices, and one or more non-volatile storage devices having at least two partitions. At least one operating system dataset representing a corresponding set of one or more operating system volumes may be stored on one or more first partitions of the at least two partitions, and the one or more non-volatile storage devices may further store a bootloader configured to cause the one or more processors to: a) obtain one or more reference hash values for a first operating system dataset stored on one of the non-volatile storage devices, b) authenticate the first operating system dataset using the one or more reference hash values, c) create, using the first operating system dataset, an operating system volume on a second partition of the at least two partitions, and d) cause a kernel of a first operating system to be loaded into the one or more memory devices from the operating system volume and to be executed by the one or more processors responsive, at least in part, to a successful authentication of the first operating system dataset.

In some such implementations, the bootloader may be configured to cause the one or more processors to perform at least (b) through (d) every time the apparatus is booted.

In some implementations of the apparatus, the apparatus may include one or more displays, a credit input device, and one or more player-input devices. In such implementations, the one or more displays, the credit input device, and the one or more player-input devices may be operably connected with the one or more processors and the one or more memory devices, and the one or more non-volatile storage devices may further store instructions for controlling the one or more processors to cause a wagering game to be displayed on the one or more displays after the kernel of the first operating system is executed.

In some implementations of the apparatus, the one or more reference hash values may result from hashing a reference version of the first operating system dataset according to a first set of one or more hashing operations and the bootloader may be further configured to cause the one or more processors to: obtain the one or more reference hash values in (a) in an encrypted state and authenticate the first operating system dataset using the one or more reference hash values in (b) by: decrypting the one or more reference hash values from the encrypted state to obtain the one or more reference hash values, obtaining one or more test hash values by hashing the first operating system dataset according to the first set of one or more hashing operations, and determining, based on the one or more test hash values and the one or more reference hash values, that the first operating system dataset matches the reference version of the first operating system dataset.

In some implementations of the apparatus, the first operating system dataset may include at least a first portion corresponding to a first operating system volume of the one or more operating system volumes that the first operating system dataset represents, the reference version of the first operating system dataset includes at least a first reference portion corresponding to the first portion, the first portion is a byte-for-byte copy of the first reference portion except that one or more bytes of the first N−1 bytes of the first portion differs from one or more bytes of the first N−1 bytes of the first reference portion, and the bootloader is further configured to cause, prior to or during (b) or (c), the one or more processors to adjust the first N−1 bytes of each first portion to match the first N−1 bytes of the corresponding first reference portion such that the authentication in (b) takes into account the adjusted first N−1 bytes of each first portion.

In some implementations of the apparatus, the first operating system volume may be formatted such that the first N−1 bytes of the operating system volume indicate that that first operating system volume is formatted as a Microsoft® New Technology File System (NTFS®) volume and the first N−1 bytes of the first portion do not indicate formatting as a Microsoft® NTFS® volume. In some such implementations of the apparatus, N may equal 5.

In some implementations of the apparatus, the bootloader may be further configured to cause the one or more processors to cause, as part of (c), the adjusted first N−1 bytes of the first portion and then the Nth byte through the last byte of the first portion to be serially copied byte-for-byte to one of the second partitions.

In some implementations of the apparatus, the bootloader may be further configured to cause the one or more processors to: incrementally generate incremental test hash values of the adjusted first N−1 bytes of the first portion and the Nth byte through the last byte of the first portion during the copying of the adjusted first N−1 bytes of the first portion and the Nth byte through the last byte of the first portion, obtain one or more incremental reference hash values, each incremental reference hash value corresponding to one of the one or more incremental test hash values and resulting from hashing a portion of the reference version of the first operating system dataset corresponding with the portion of the adjusted first N−1 bytes of the first portion and the Nth byte through the last byte of the first portion used to generate the corresponding incremental test hash value, compare each incremental reference hash value to the corresponding incremental test hash value, and generate an error condition if any one of the one or more incremental reference hash values and the corresponding incremental test hash value of the one or more incremental test hash values indicates an authentication failure.

In some implementations of the apparatus, each of the one or more reference hash values may be encrypted using a private key of a corresponding public/private key pair and the bootloader may be further configured to cause each of the one or more reference hash values to be decrypted with the corresponding public key of the corresponding public/private key pair.

In some implementations of the apparatus, a plurality of operating system datasets may be stored on the one or more first partitions, the plurality of operating system datasets may include the first operating system dataset, each operating system dataset may be associated with data indicating a date associated with that operating system dataset, the first operating system data set may be associated with data indicating a first date that is more recent than the dates indicated by the data associated with the other operating system datasets of the plurality of operating system datasets, and the bootloader may be configured to select the first operating system dataset to perform (a) through (d) based on the first date being more recent than the dates indicated by the data associated with the other operating system datasets of the plurality of operating system datasets.

In some implementations of the apparatus, there may be a plurality of operating system datasets stored on the one or more first partitions, the plurality of operating system datasets may include the first operating system dataset, each operating system dataset may be associated with data indicating a date associated with that operating system dataset, and the bootloader may be further configured to cause the one or more processors to: select the first operating system dataset prior to (a) after unsuccessfully attempting one or more times to authenticate one or more other operating system datasets of the plurality of operating system datasets that are each, based on the date associated with each of the one or more other operating system datasets, newer than the first operating system dataset and attempt to authenticate, at least until one of the operating system datasets is successfully authenticated, each of the one or more other operating system datasets of the plurality of operating system datasets using one or more corresponding reference hash values for that operating system dataset and in a reverse chronological order based on the dates associated with each other operating system dataset of the one or more other operating system datasets.

In some implementations of the apparatus, the one or more first partitions may be designated in one or more partition tables of the one or more non-volatile storage devices as being a partition type that is an unallocated partition type for the first operating system.

In some implementations of the apparatus, the one or more first partitions may be designated in one or more partition tables of the one or more non-volatile storage devices as being hidden partitions that are not visible to a file system of the first operating system.

In some implementations of the apparatus, the one or more operating system datasets may include at least one operating system dataset that represents one or more operating system volumes for a version of Microsoft® Windows®.

In some implementations of the apparatus, the one or more operating system datasets may include at least one operating system dataset that represents one or more operating system volumes for Microsoft® Windows 10®.

In some implementations of the apparatus, the one or more operating system datasets may include at least one operating system dataset that represents one or more operating system volumes for an operating system that modifies the second partition during execution.

In some implementations of the apparatus, the one or more storage devices may further store one or more computer-executable instructions that are further configured to: be executable by the kernel of the first operating system and cause the one or more processors to: obtain an additional operating system dataset representing an additional corresponding one or more operating system volumes via a network connection, obtain a corresponding one or more additional reference hash values for the additional operating system dataset, and store the additional operating system dataset in the one or more first partitions.

In some implementations, a method may be provided that includes a) obtaining, by one or more processors, one or more reference hash values for a first operating system dataset stored on one or more first partitions of one or more non-volatile storage devices having at least two partitions, b) authenticating, by the one or more processors, the first operating system dataset using the one or more reference hash values, c) creating, using the first operating system dataset and by the one or more processors, an operating system volume on a second partition of the at least two partitions, and d) causing a kernel of a first operating system to be loaded into the one or more memory devices from the operating system volume by the one or more processors and to be executed by the one or more processors responsive, at least in part, to a successful authentication of the first operating system dataset.

In some implementations of the method, the method may further include performing at least (b) through (d) every time a device having the one or more processors is booted.

In some implementations of the method, the method may further include causing the one or more processors to cause a wagering game to be displayed on one or more displays after the kernel of the first operating system is executed.

In some implementations of the method, the one or more reference hash values may result from hashing a reference version of the first operating system dataset according to a first set of one or more hashing operations and the method may further include: obtaining the one or more reference hash values in (a) in an encrypted state and authenticating the first operating system dataset using the one or more reference hash values in (b) by: decrypting the one or more reference hash values from the encrypted state to obtain the one or more reference hash values, obtaining one or more test hash values by hashing the first operating system dataset according to the first set of one or more hashing operations, and determining, based on the one or more test hash values and the one or more reference hash values, that the first operating system dataset matches the reference version of the first operating system dataset.

In some implementations of the method, the first operating system dataset may include at least a first portion corresponding to a first operating system volume of the one or more operating system volumes that the first operating system dataset represents, the reference version of the first operating system dataset may include at least a first reference portion corresponding to the first portion, the first portion may be a byte-for-byte copy of the first reference portion except that one or more bytes of the first N−1 bytes of the first portion differs from one or more bytes of the first N−1 bytes of the first reference portion, and the method may further include causing, prior to or during (b) or (c), the one or more processors to adjust the first N−1 bytes of each first portion to match the first N−1 bytes of the corresponding first reference portion such that the authentication in (b) takes into account the adjusted first N−1 bytes of each first portion.

In some implementations of the method, the first operating system volume may be formatted such that the first N−1 bytes of the operating system volume indicate that that first operating system volume is formatted as a Microsoft® New Technology File System (NTFS®) volume and the first N−1 bytes of the first portion do not indicate formatting as a Microsoft® NTFS® volume. In some such implementations of the method, N may equal 5.

In some implementations of the method, the method may further include serially copying, using the one or more processors and as part of (c), the adjusted first N−1 bytes of the first portion and then the Nth byte through the last byte of the first portion byte-for-byte to one of the second partitions.

In some implementations of the method, the method may further include incrementally generating, by the one or more processors, incremental test hash values of the adjusted first N−1 bytes of the first portion and the Nth byte through the last byte of the first portion during the copying of the adjusted first N−1 bytes of the first portion and the Nth byte through the last byte of the first portion; obtaining, by the one or more processors, one or more incremental reference hash values, each incremental reference hash value corresponding to one of the one or more incremental test hash values and resulting from hashing a portion of the reference version of the first operating system dataset corresponding with the portion of the adjusted first N−1 bytes of the first portion and the Nth byte through the last byte of the first portion used to generate the corresponding incremental test hash value; comparing, by the one or more processors, each incremental reference hash value to the corresponding incremental test hash value; and generating, by the one or more processors, an error condition if any one of the one or more incremental reference hash values and the corresponding incremental test hash value of the one or more incremental test hash values indicates an authentication failure.

In some implementations of the method, each of the one or more reference hash values may be encrypted using a private key of a corresponding public/private key pair and the method may further include causing each of the one or more reference hash values to be decrypted with the corresponding public key of the corresponding public/private key pair.

In some implementations of the method, there may be a plurality of operating system datasets stored on the one or more first partitions, the plurality of operating system datasets may include the first operating system dataset, each operating system dataset may be associated with data indicating a date associated with that operating system dataset, the first operating system data set may be associated with data indicating a first date that is more recent than the dates indicated by the data associated with the other operating system datasets of the plurality of operating system datasets, and the method may further include selecting the first operating system dataset for performance of (a) through (d) based on the first date being more recent than the dates indicated by the data associated with the other operating system datasets of the plurality of operating system datasets.

In some implementations of the method, there may be a plurality of operating system datasets stored on the one or more first partitions, the plurality of operating system datasets may include the first operating system dataset, each operating system dataset may be associated with data indicating a date associated with that operating system dataset, and the method may further include: selecting, by the one or more processors, the first operating system dataset prior to (a) after unsuccessfully attempting one or more times to authenticate one or more other operating system datasets of the plurality of operating system datasets that are each, based on the date associated with each of the one or more other operating system datasets, newer than the first operating system dataset and attempting, by the one or more processors, to authenticate, at least until one of the operating system datasets is successfully authenticated, each of the one or more other operating system datasets of the plurality of operating system datasets using one or more corresponding reference hash values for that operating system dataset and in a reverse chronological order based on the dates associated with each other operating system dataset of the one or more other operating system datasets.

In some implementations of the method, the one or more first partitions may be designated in one or more partition tables of the one or more non-volatile storage devices as being a partition type that is an unallocated partition type for the first operating system.

In some implementations of the method, the one or more first partitions may be designated in one or more partition tables of the one or more non-volatile storage devices as being hidden partitions that are not visible to a file system of the first operating system.

In some implementations of the method, the one or more operating system datasets may include at least one operating system dataset that represents one or more operating system volumes for a version of Microsoft® Windows®.

In some implementations of the method, the one or more operating system datasets may include at least one operating system dataset that represents one or more operating system volumes for Microsoft® Windows 10®.

In some implementations of the method, the one or more operating system datasets may include at least one operating system dataset that represents one or more operating system volumes for an operating system that modifies the second partition during execution.

In some implementations of the method, the method may further include obtaining, by the one or more processors, an additional operating system dataset representing an additional corresponding one or more operating system volumes via a network connection, obtaining, by the one or more processors, a corresponding one or more additional reference hash values for the additional operating system dataset; and storing, by the one or more processors, the additional operating system dataset in the one or more first partitions.

In some implementations, a non-transitory, machine-readable storage medium storing machine-readable instructions for a bootloader may be provided. The machine-readable instructions, when executed by one or more processors of an apparatus having i) one or more non-volatile storage devices having at least two partitions and ii) one or more memory devices, may cause the one or more processors to: a) obtain one or more reference hash values for a first operating system dataset stored on one or more first partitions of the at least two partitions, b) authenticate the first operating system dataset using the one or more reference hash values, c) create, using the first operating system dataset, an operating system volume on a second partition of the at least two partitions, and d) cause a kernel of a first operating system to be loaded into the one or more memory devices from the operating system volume and to be executed by the one or more processors responsive, at least in part, to a successful authentication of the first operating system dataset.

In some implementations of the non-transitory, machine-readable storage medium, the bootloader may be configured to cause the one or more processors to perform at least (b) through (d) every time the apparatus is booted.

In some implementations of the non-transitory, machine-readable storage medium, the non-transitory, machine-readable storage medium may further store further machine-readable instructions for the bootloader which, when executed by the one or more processors, cause the one or more processors to cause a wagering game to be displayed on one or more displays after the kernel of the first operating system is executed.

In some implementations of the non-transitory, machine-readable storage medium, the one or more reference hash values may result from hashing a reference version of the first operating system dataset according to a first set of one or more hashing operations and the non-transitory, machine-readable storage medium may further store further machine-readable instructions for the bootloader which, when executed by the one or more processors, cause the one or more processors to: obtain the one or more reference hash values in (a) in an encrypted state, and authenticate the first operating system dataset using the one or more reference hash values in (b) by: decrypting the one or more reference hash values from the encrypted state to obtain the one or more reference hash values, obtaining one or more test hash values by hashing the first operating system dataset according to the first set of one or more hashing operations, and determining, based on the one or more test hash values and the one or more reference hash values, that the first operating system dataset matches the reference version of the first operating system dataset.

In some implementations of the non-transitory, machine-readable storage medium, the first operating system dataset may include at least a first portion corresponding to a first operating system volume of the one or more operating system volumes that the first operating system dataset represents, the reference version of the first operating system dataset may include at least a first reference portion corresponding to the first portion, the first portion may be a byte-for-byte copy of the first reference portion except that one or more bytes of the first N−1 bytes of the first portion differs from one or more bytes of the first N−1 bytes of the first reference portion, and the non-transitory, machine-readable storage medium may further store further machine-readable instructions for the bootloader which, when executed by the one or more processors, cause the one or more processors to, prior to or during (b) or (c), adjust the first N−1 bytes of each first portion to match the first N−1 bytes of the corresponding first reference portion such that the authentication in (b) takes into account the adjusted first N−1 bytes of each first portion.

In some implementations of the non-transitory, machine-readable storage medium, the first operating system volume may be formatted such that the first N−1 bytes of the operating system volume indicate that that first operating system volume is formatted as a Microsoft® New Technology File System (NTFS®) volume and the first N−1 bytes of the first portion do not indicate formatting as a Microsoft® NTFS® volume. In some such implementations of the non-transitory, machine-readable storage medium, N may equal 5.

In some implementations of the non-transitory, machine-readable storage medium, the non-transitory, machine-readable storage medium may further store further machine-readable instructions for the bootloader which, when executed by the one or more processors, cause the one or more processors to, as part of (c), serially copy the adjusted first N−1 bytes of the first portion and then the Nth byte through the last byte of the first portion byte-for-byte to one of the second partitions.

In some implementations of the non-transitory, machine-readable storage medium, the non-transitory, machine-readable storage medium may further store further machine-readable instructions for the bootloader which, when executed by the one or more processors, cause the one or more processors to: incrementally generate incremental test hash values of the adjusted first N−1 bytes of the first portion and the Nth byte through the last byte of the first portion during the copying of the adjusted first N−1 bytes of the first portion and the Nth byte through the last byte of the first portion, obtain one or more incremental reference hash values, each incremental reference hash value corresponding to one of the one or more incremental test hash values and resulting from hashing a portion of the reference version of the first operating system dataset corresponding with the portion of the adjusted first N−1 bytes of the first portion and the Nth byte through the last byte of the first portion used to generate the corresponding incremental test hash value, compare each incremental reference hash value to the corresponding incremental test hash value, and generate an error condition if any one of the one or more incremental reference hash values and the corresponding incremental test hash value of the one or more incremental test hash values indicates an authentication failure.

In some implementations of the non-transitory, machine-readable storage medium, each of the one or more reference hash values may be encrypted using a private key of a corresponding public/private key pair and the non-transitory, machine-readable storage medium may further store further machine-readable instructions for the bootloader which, when executed by the one or more processors, cause the one or more processors to cause each of the one or more reference hash values to be decrypted with the corresponding public key of the corresponding public/private key pair.

In some implementations of the non-transitory, machine-readable storage medium, there may be a plurality of operating system datasets stored on the one or more first partitions, the plurality of operating system datasets may include the first operating system dataset, each operating system dataset may be associated with data indicating a date associated with that operating system dataset, the first operating system data set may be associated with data indicating a first date that is more recent than the dates indicated by the data associated with the other operating system datasets of the plurality of operating system datasets, and the non-transitory, machine-readable storage medium may further store further machine-readable instructions for the bootloader which, when executed by the one or more processors, cause the one or more processors to select the first operating system dataset to perform (a) through (d) based on the first date being more recent than the dates indicated by the data associated with the other operating system datasets of the plurality of operating system datasets.

In some implementations of the non-transitory, machine-readable storage medium, there may be a plurality of operating system datasets stored on the one or more first partitions, the plurality of operating system datasets may include the first operating system dataset, each operating system dataset may be associated with data indicating a date associated with that operating system dataset, and the non-transitory, machine-readable storage medium further may store further machine-readable instructions for the bootloader which, when executed by the one or more processors, cause the one or more processors to: select the first operating system dataset prior to (a) after unsuccessfully attempting one or more times to authenticate one or more other operating system datasets of the plurality of operating system datasets that are each, based on the date associated with each of the one or more other operating system datasets, newer than the first operating system dataset and attempt to authenticate, at least until one of the operating system datasets is successfully authenticated, each of the one or more other operating system datasets of the plurality of operating system datasets using one or more corresponding reference hash values for that operating system dataset and in a reverse chronological order based on the dates associated with each other operating system dataset of the one or more other operating system datasets.

In some implementations of the non-transitory, machine-readable storage medium, the one or more first partitions may be designated in one or more partition tables of the one or more non-volatile storage devices as being a partition type that is an unallocated partition type for the first operating system.

In some implementations of the non-transitory, machine-readable storage medium, the one or more first partitions may be designated in one or more partition tables of the one or more non-volatile storage devices as being hidden partitions that are not visible to a file system of the first operating system.

In some implementations of the non-transitory, machine-readable storage medium, the one or more operating system datasets may include at least one operating system dataset that represents one or more operating system volumes for a version of Microsoft® Windows®.

In some implementations of the non-transitory, machine-readable storage medium, the one or more operating system datasets may include at least one operating system dataset that represents one or more operating system volumes for Microsoft® Windows 10®.

In some implementations of the non-transitory, machine-readable storage medium, the one or more operating system datasets may include at least one operating system dataset that represents one or more operating system volumes for an operating system that modifies the second partition during execution.

In some implementations of the non-transitory, machine-readable storage medium, the one or more storage devices may further store one or more computer-executable instructions that are configured to be executable by the kernel of the first operating system and that are configured to cause the one or more processors to: obtain an additional operating system dataset representing an additional corresponding one or more operating system volumes via a network connection, obtain a corresponding one or more additional reference hash values for the additional operating system dataset, and store the additional operating system dataset in the one or more first partitions.

These and other implementations will be evident from the discussion herein.

The implementations shown in the Figures are merely representative examples and are to be understood to not limit the scope of this disclosure.

DETAILED DESCRIPTION

Figure 1:
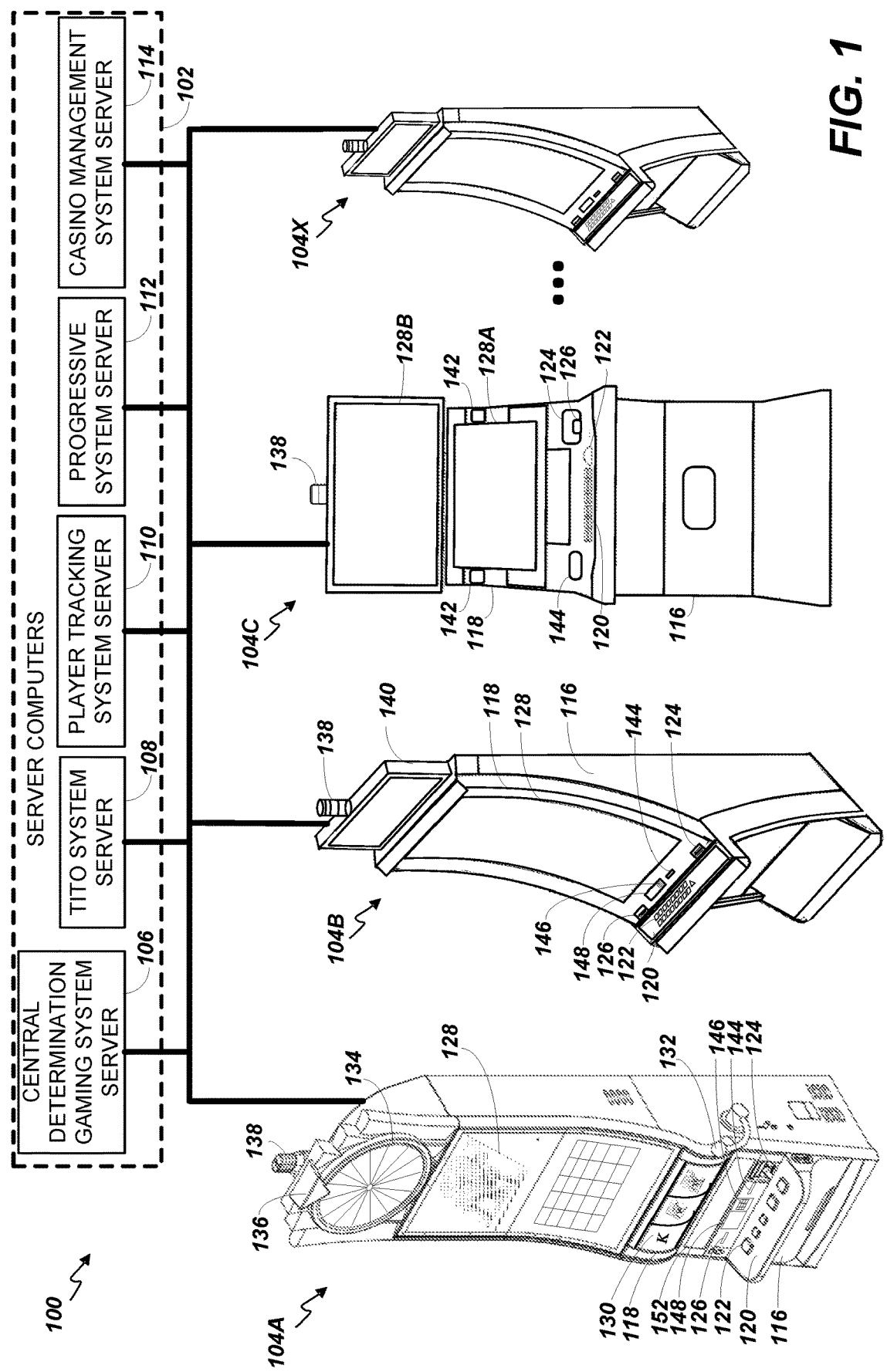
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
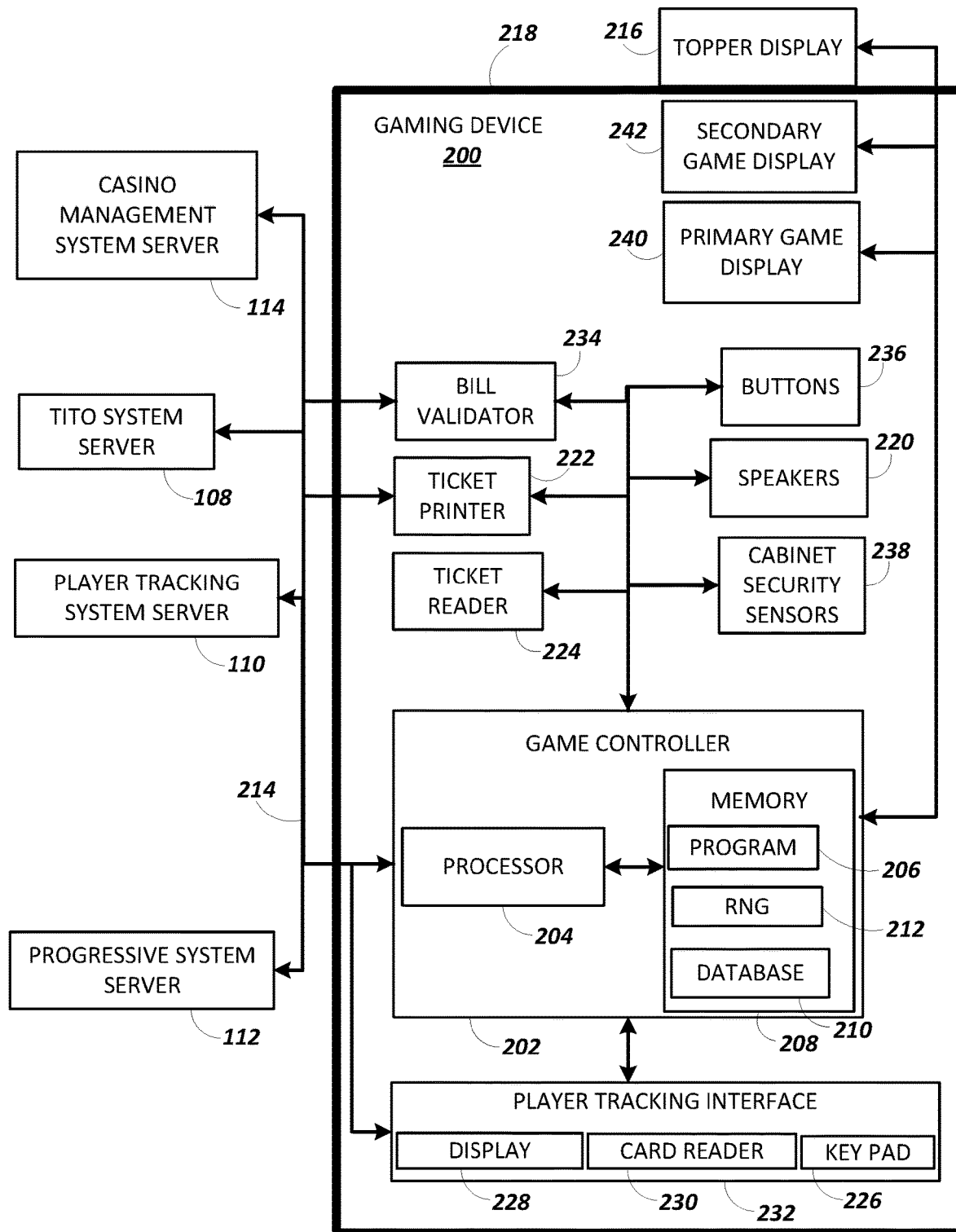
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software and provide new technology in that they provide a mechanism by which to ensure that certified copy of a modern operating system, such as Microsoft® Windows 10®, may be authenticated and used in an electronic gaming machine. Such improvements directly implicate the security of such systems, and provide a way to utilize such modern operating systems within the constraints of a robust authentication framework to ensure that such electronic gaming machines are not compromised or otherwise altered in a way that would make them non-compliant with regulatory requirements. These embodiments are thus not merely new game rules or simply a new display pattern.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

In one or more embodiments, one or more of gaming devices (e.g., gaming devices 104A-104X in FIG. 1) are able to operate in a tournament mode after receiving one or more tournament event triggers. The tournament mode can be a separate operation mode, where the gaming devices perform gaming operations that differ from their primary game mode. As discussed above, gaming devices generally provide one or more games, such as mechanical slot games, video slot games, video poker, video black jack, video pachinko, keno, bingo, and lottery, when in primary game mode. Because of this, gaming devices can each run a separate instance of a game or run different games from each other in primary game mode. When gaming devices receive a tournament event trigger, gaming devices suspends and/or logs out of the primary game mode and switches over to tournament mode.

In tournament mode, the gaming devices load and authenticate a different digitally signed dataset that includes a tournament version of the operating software from a separate storage device partition. By doing so the gaming devices to become logically linked together such that each gaming device synchronizes with each other to run a common distributed tournament game that generates a multi-player environment. In certain implementations, the common distributed tournament game may differ or be a different version of the game that runs in primary game mode. For example, rather than running a slot game that relies on a single RNG, the gaming devices, in tournament mode, could implement a slot game that determines a tournament outcome based on the RNGs of all the linked gaming devices collectively. To enhance a player's gaming experience, tournament mode can modify and synchronize the sound, music, reel spin speed, and/or other operations of the gaming devices according to the tournament game play. After tournament game play ends, operators can then switch back gaming devices from tournament mode to primary game mode.

As can be seen from the above discussion, electronic gaming machines are complex devices that typically include extensive peripherals and components not normally found in standard desktop computing systems. One particular area in which such electronic gaming machines differ from standard computing systems is in the level of security that is implemented in such electronic gaming machines, e.g., in gaming devices 104A-104X.

Electronic gaming machines, such as gaming devices 104A-104X, are transactional in nature—each wager placed on an electronic gaming machine generally involves an input or allocation of a credit, and results in an output of a game of chance and, if a winning outcome is achieved, an award of some sort. Given the random nature of wagering game play, the monetary amounts involved, and the large numbers of transactions, electronic gaming machines may be tempting targets for manipulation by malicious parties, e.g., criminal enterprises, hackers, etc., who wish to alter the operation of such devices so that the odds of winning (or losing) are increased or such that the operation of the gaming machine is, in some way, compromised in a way that benefits the malicious party and harms either the gaming machine operator or the player. To prevent such tampering, modern electronic gaming machines are subject to very strict regulatory oversight to ensure that they do not operate in a fraudulent or otherwise undesirable manner.

In many jurisdictions, such regulatory oversight of electronic gaming machines includes certification of the electronic gaming machine software by an independent testing or certification authority to ensure that each gaming machine in question meets regulatory approval. In order to prevent post-certification alteration of gaming machines, e.g., by altering the software thereof in an unauthorized manner, electronic gaming machines are typically configured to only be bootable in a secure manner, i.e., where each stage of the boot process authenticates the code, e.g., executable code, binaries, configuration files, etc., for the next stage of the boot process prior to executing it (the very first code that is run, of course, cannot be authenticated in this manner—confidence that such initial boot code is certified may, for example, be provided through alternate means, e.g., by storing such code in a read-only non-volatile memory or otherwise hard-coding it such that it is not possible to alter the code without having physical access to the inner workings of the electronic gaming machine). Such secure boot methods may be referred to herein as "secure boot chain," or the like. Electronic gaming machines are not the only systems where such concerns and attendant mitigation measures are applicable—the discussion herein, it will be recognized, may be generally applicable to any computing devices in which it is desirable to use an authenticated, modern operating system, e.g., Windows 10® or the like. For example, electronic voting machines, automatic teller machines, or other devices where a secure and certified modern operating system is desired may similarly benefit from such secure bootloaders and operations.

As discussed above, the secure boot process for an electronic gaming machine may verify that the operating system is authentic, i.e., identical to the software that was certified by the certification authority, prior to allowing such software to be executed by the processors of the electronic gaming machine. Such authentication may be performed, for example, through any suitable digital authentication technique. Such secure booting and authentication operations may, for example, be performed by the one or more processors 204 of the electronic gaming machines 104a-104X, or of a similar system.

Digital authentication refers to a process by which the provenance or origin of a dataset can be easily checked and re-validated, thereby providing confidence that the dataset in question is the actual dataset that is authorized for use. Thus, for example, if the dataset in question allegedly represents an operating system that has been certified by a certification authority, then digital authentication may be performed prior to executing that operating system on the gaming machine to ensure that the operating system in the dataset has been certified.

One way to digitally authenticate a dataset is to encrypt the "source" dataset using a key that only the originating party and the receiving party have or, in most cases, using a public/private key encryption system where the originating party uses the private key to encrypt the dataset and the party wishing to authenticate it uses the corresponding public key to decrypt the encrypted dataset. If the encrypted dataset is altered in any way during transit, such alteration will cause the dataset to not decrypt properly for the recipient. In the case of computer code, such improper decryption would cause the code to no longer be executable. Decryption, however, is an extremely computationally intensive process—if the encrypted dataset is large, e.g., an entire operating system (the total size of a modern operating systems such as Windows 10® can be on the order of 15 to 20 gigabytes), then the time it would take to encrypt and/or decrypt such a dataset would be significant, e.g., an hour or more (depending on various factors such as dataset size, processor speed, computational load, etc.). To avoid such issues, most digital authentication systems instead subject the dataset to a hashing process in which the dataset, which may be of any length, is processed by a "hash function" to produce a "hash value" (also referred to herein as a "hash"), which is a data value of a fixed length. Hash functions used for digital authentication purposes are typically referred to as "cryptographic hash functions," and reference to "hash functions" herein should be understood to refer to such cryptographic hash functions.

A hash function creates an effectively unique signature for the dataset that is processed using the hash function. If a dataset is hashed using a particular hash function, then an exact copy of that dataset hashed using the same hash function will produce exactly the same hash value. If the copy of the dataset is different from the original dataset by even a single byte, then the hash value that is generated for the copy will be completely different from the hash value that is generated for the original (using the same hash function), indicating that the copy is not a faithful reproduction of the original dataset (and thus fails authentication).

It will be readily recognized that given the fixed length of the hash function output and the ability to accept input of any size, there will be multiple datasets that will, after being hashed with a particular hash function, produce identical hash values. The possibility of multiple such datasets does not, however, pose a significant security risk since, due to how hash functions operate, it is extremely unlikely that the other datasets sharing a hash value with a target dataset would, in any way, actually resemble the target dataset (or even be comprehensible data). It is also extremely unlikely that someone would be able to deliberately craft a dataset that would produce a given hash value. As a result, hash values provide a way to verify, with high confidence, that a dataset is unchanged relative to a reference dataset, e.g., to the source dataset. If one then encrypts a source dataset's hash value, similar to the example discussed above in which the dataset itself was encrypted, then such encryption may serve to authenticate the provenance of the hash value (the party wishing to authenticate the dataset is provided both the dataset and the corresponding encrypted hash value), and if that hash value, once unencrypted, matches exactly with a hash value computed for a putative copy of the source dataset, then such a match provides high confidence that the putative copy of the source dataset is actually an exact copy of the source dataset. The process of hashing the source dataset and encrypting the resulting hash may be referred to herein as "digital signing."

In the context of electronic gaming machines, the operating system that is stored on the operating system and/or boot partition of the electronic gaming machine be authenticated by the secure boot process prior to execution of the operating system kernel, thereby establishing an unbroken chain of authenticity that traces back to the operating system and other software that was certified by a certification authority and providing assurance that the operating system and other software match exactly with the operating system and other software that was certified by the certification authority.

In the discussion below, the disk volume or disk volumes that may be used to store operating system-related files are referred to herein as an "operating system volume" or "operating system volumes." For clarity, a disk partition refers to a portion of a physical disk (or portions from multiple physical disks) that is designated as being reserved for a particular purpose. A volume, however, is an accessible storage area with a single file system that is located on a disk partition (or, in some cases, spanning across multiple partitions). It will be understood that a "disk," as the term is used herein, may refer to any type of mass storage device, e.g., a hard drive or hard disk, a solid-state drive, an NVRAM drive, etc. It will be further understood that use of the term "disk" does not imply that the device in question is limited to only a storage device with actual, spinning disks in it and that other types of mass storage device, such as the solid state drives mentioned above, are also to be considered to be "disks" even though they may not have any moving parts, let alone actual disks within them.

In the case of Windows 10®, for example, there are usually two volumes that would be, under the nomenclature discussed above, considered to be "operating system volumes." The first volume, which is referred to as the "system volume" (and may alternatively be referred to as a "system partition" in some instances), is on a hidden partition and is used to store various hardware-specific files used by Windows 10® to interface with the various hardware components of a particular computing device during the startup of the operating system; the system volume also usually stores the Windows 10® bootloader, which takes over the boot process from an earlier-stage bootloader and handles configuring and launching the Windows 10® operating system. The second volume, which is referred to somewhat confusingly as the "boot volume" by Microsoft® (or may be referred to also as the "boot partition" in some instances), contains the remaining Windows® operating system files. In some other operating systems, such as Linux, a system volume and a boot volume may also be present, but may, in effect, be reversed from the Windows 10® convention, with the boot volume storing the bootloader and various hardware-specific files and the system volume storing the remaining operating system files. In order to accommodate such different naming conventions, the term "operating system volume" is used herein to refer to a volume that stores operating system-related files.

For practical reasons, operating system volumes, some of which may, for an operating system like Microsoft® Windows 10®, include thousands of files and may easily occupy 15 to 20 gigabytes of space, may be authenticated in a single hashing process. For example, such files may be stored in a particular type of file system used by the operating system, but such a file system may not yet be established and accessible when the authentication process is performed, e.g., during the boot process. Thus, the authentication process may involve, for example, simply treating the entire operating system volume as a single, large file that is then subjected to a hashing process. The advantage to such a convention is that only one hash value would need to be computed and only one hash value would need to be decrypted to compare against the computed hash value. At the other end of the spectrum, one could individually authenticate every file in the operating system volume (although this would require being able to extract or identify every file in the operating system volume), but doing so would require each file to have its own hash value that would then be compared against a corresponding (decrypted) authentication hash value; this would be computationally inefficient, however, since thousands of hash values would likely need to be decrypted instead of just a single hash value. Moreover, thousands of hash values would need to be stored for each operating system volume. There is one advantage to a file-by-file authentication approach, however, which is that such authentication would be completely insensitive to exactly how the files were stored within the operating system volume. For example, if a particular file were to be moved from one location in the operating system volume to another location but was otherwise left unchanged, such a movement would cause the hash value based on the entire operating system volume to change completely as compared with the hash value of the entire operating system volume prior to the move, thus causing the authentication of the operating system based on that hash value to fail—even if there was no functional difference between the pre-move operating system and the post-move operating system. If file-by-file authentication were to be performed, then such movement would have no effect on the authentication of the file. Given the computational overhead with the file-by-file approach to authentication, as well as the fact that the file system needed for identifying and retrieving the files in question is typically unavailable at the stage when authentication would need to be performed, most electronic gaming machines are designed to perform authentication of the operating system by authenticating a single, large dataset that includes the entire operating system volume.

The present inventor discovered that for some modern operating systems, such as Microsoft® Windows 10®, the operating system itself would slightly modify the data on the system and/or the boot volume, i.e., one or more of the operating system volumes, every time the operating system booted. In fact, in such operating systems, the operating system may even slightly modify the data on volumes that, in theory, the operating system would have no reason to even access, e.g., volumes on recovery partitions. Such modifications may, for example, not be to the files stored in those volumes, but to portions of such volumes that may be used for file system maintenance/bookkeeping or to portions of the volume that are "empty," i.e., not allocated for actually storing a file in the file system of that volume. For example, in the New Technology File System (NTFS®), which is a proprietary file system used by Microsoft®, portions of each NTFS® volume are allocated for purposes such as journaling, maintenance, security logging, boot management, and other "background" file system management tasks related to each such NTFS® volume—the exact purpose and location of such portions is not publicly known (since the file system is proprietary, Microsoft® does not publish the details of its operation). Some of these portions may be altered each time the operating system interacts with such an NTFS® volume, regardless of whether any files stored on the NTFS® volume are changed. Such modifications may also arise when the files in the volume may be rearranged, e.g., to defragment them or otherwise change where they are stored on the physical disk without altering the digital content of the files. As a result, even if the operating system volume on the operating system partition were to be authenticated during the boot process, the actual operation of that operating system would cause the operating system volume on which it is stored to be altered somewhat (an alteration of even a single bit would be sufficient to cause authentication to fail) and thus fail to be authenticated during the next boot process using the corresponding hash value. In the Windows 10® operating system, this issue was, to the present inventor's knowledge, unknown or unappreciated, even to Microsoft® engineers, until the present inventor discovered it.

This behavior of Windows 10® is believed to be caused by the enforced use of the NTFS® in Windows 10®, whereas previous versions of Windows® permitted the use of the File Allocation Table 32 (FAT32) file system. The FAT32 file system does not have the file journaling and various other features provided by NTFS, which allowed for a FAT32 operating system volume to be kept from being modified by the operating system, which is how previous electronic gaming machines were able to authenticate the operating system partition or volume for every boot or reboot of such electronic gaming machines. In advanced file systems, such as Microsoft® NTFS®, the file system may track the files stored within it in complex data structures that may, for example, allow for journaling to record metadata changes to the volume, e.g., to reflect timestamps or various other pieces of information related to tracking the integrity of the file system. As a result, the volume on which the file system is stored may experience some change through normal operation of the file system. The term "dynamic file system" is used herein to refer to advanced file systems in which a volume formatted for such a file system cannot be guaranteed to remain unchanged after being accessed by an operating system, e.g., has one or more advanced features such as journaling, security logging, boot management, etc. that do not necessarily affect files stored in the volume but that do result in file system metadata stored in the volume changing when such a volume is accessed by an operating system. The term "static file system" is used herein to refer to file systems in which a volume formatted for such a file system, in contrast to a dynamic file system, can be guaranteed to remain unchanged after being accessed by an operating system. In some instances, some dynamic file systems may be configurable to operate as static file systems, e.g., by disabling advanced features that may cause a volume formatted with a dynamic file system to not be able to be guaranteed to remain unchanged; in such instances, the re-configured dynamic file system would be considered, in the context of this disclosure, to be a static file system.

The operations discussed herein may be used for volumes with either type of file system (dynamic or static), although the use of such operations in conjunction with dynamic file systems, such as NTFS®, allows for secure, authenticated booting of operating systems that use dynamic file systems (which would otherwise cause such boot authentication to fail due to the dynamic nature of such file systems).

In the case of Windows 10®, the "system volume" is actually formatted with a FAT32 file system, which is a much simpler file system to implement in a bootloader as compared with, for example, the NTFS® "boot volume" from which the Windows 10® bootloader stored on the system volume then loads the operating system. However, the Windows 10® bootloader also modifies the FAT32 system volume during every boot sequence, e.g., by changing the BCD (boot configuration data) that is recorded in the system volume, which causes the system volume to also be altered from its pre-boot state.

To address this issue, the present inventor conceived of an electronic gaming machine (or, more generally, a computing device) in which one or more digitally signed datasets, each representing a version of one or more operating system volumes, are stored in a "shadow" partition; the shadow partition, for example, may be assigned a partition type such as a recovery partition or similar to cause the intended operating system to avoid making the shadow partition available for general access through its file system. Such electronic gaming machines may have a specially configured secure bootloader that is configured to, when the electronic gaming machine is booted or rebooted, select one of the one or more datasets on the shadow partition, perform an authentication process on the selected dataset, create one or more operating system volumes on one or more operating system partitions of the electronic gaming machine using the selected dataset on the shadow partition, and, if the selected dataset is authenticated, cause a kernel stored on the newly created operating system volume or volumes on the operating system partition(s) to be executed. A kernel, as the term is used herein, refers to the software that provides the core functionality of an operating system. The secure bootloader may directly cause the kernel to be executed, e.g., by loading the kernel from one or more operating system volumes into volatile memory and causing one or more processors of the electronic gaming machine to execute the kernel, or may indirectly cause the kernel to be executed, e.g., by loading an intermediate piece of operating system-specific software from one or more operating system volumes into volatile memory and executing it to ultimately cause the kernel to execute. For example, in Windows 10®, an operating system loader program may be caused to be executed by the secure bootloader to manage the process of launching the operating system kernel. Both scenarios are to be understood as instances of the secure bootloader causing the kernel of the operating system to be executed.

Since the operating system volume on the operating system partition is newly created (or re-created) by the secure bootloader with every boot or reboot of the electronic gaming system, this ensures that whatever modifications may have been made to the operating system volume(s) on the operating system partition(s) by the operating system during the previous instance in which the operating system was operational are removed; thus, ensuring that the operating system that is present on the operating system volume(s) on the operating system partition(s) is authenticable. In some implementations, the secure bootloader may incorporate the ability to boot into one of several modes, e.g., a secure boot mode in which operations such as those discussed above are carried out and one or more additional modes, e.g., a developer mode, in which operations such as those discussed above are not carried out. In many scenarios, however, the secure bootloader may only be bootable into one mode, i.e., the secure boot mode (this includes scenarios in which the secure bootloader may be bootable into a plurality of boot modes, all of which may be some form of secure boot mode).

Such a secure bootloader may allow for the use of modern operating systems, such as Windows 10®, which may provide a multitude of benefits, such as access to advanced features of such modern operating systems. For example, Windows 10® provides developers with the ability to mount ISO volumes (for easier loading of upgrades, easier downloads, etc.), native support for transport layer security (TLS) to allow for secure links between client and end-point, e.g., a network end-port with a secured transport layer associated with it, and access to an operating system that will continue to be supported through regular product updates from the operating system manufacturer (support for legacy operating systems may be phased out over time, resulting in such operating systems becoming obsolete and/or unsecure). In the case of Windows 10®, there may be many user interface features that are provided by the operating system that are attractive to developers, e.g., enhanced graphics capabilities, native touch-screen support, touchscreen keyboard support, and so on, all of which make developing games or other applications for the Windows 10® environment particularly attractive to developers. However, until the development of the secure bootloader discussed herein and to the present inventor's knowledge, no electronic gaming machines were able to reliably authenticate a Windows 10® operating system volume during the boot process, which precluded the use of Windows 10® in electronic gaming machines.

As noted earlier, each dataset that is stored on the shadow partition(s) may be representative of a corresponding one or more operating system volumes for an operating system or particular operating system version. For example, completely different operating systems may be represented in various datasets, or incrementally improved versions of the same operating system may be provided in various datasets, e.g., each dataset may be representative one or more operating system volumes of the same operating system but having different levels of service packs or updates installed. In the context of an electronic gaming machine (or other device in which operating system authentication is desired), each such dataset will have been digitally signed, as discussed above, to allow for the dataset, and thus the operating system that it represents, to be authenticated. At their simplest, such datasets may each be a byte-for-byte copy of one or more certified operating system volumes, which may be referred to herein as "reference volumes," "reference operating system volumes," or the like; such a dataset may be copied, byte-for-byte, by the secure bootloader into one or more operating system partitions to create a corresponding one or more operating system volumes. The secure bootloader may also authenticate the selected dataset and, assuming that the selected dataset is authenticated, cause an operating system kernel in one or more of the operating system volumes newly created in the one or more operating system partitions to execute, thereby initializing the operating system boot process.

However, it will be recognized that the datasets that are stored on the shadow partitions may take other forms as well instead of byte-for-byte copies. For example, each dataset may be a disk or partition image that may require "unpacking" of some sort by the secure bootloader in order to create the operating system volume, e.g., a structured form of replication which is not a byte-for-byte copy. Since the secure bootloader creates the one or more operating system volumes from the selected dataset prior to execution of the operating system and initialization of the accompanying file system, the dataset used to create the one or more operating system volumes may be stored and retrieved in any suitable manner by the secure bootloader, e.g., as a single contiguous block of data or as multiple, discontiguous blocks of data. In practical terms, it is likely easiest to use datasets that are simply byte-for-byte copies of the corresponding operating system volumes since the attendant secure bootloader code required to perform a byte-for-byte copy may be relatively straightforward to implement as compared to more complex schemes for creating the one or more operating system volumes of from a selected dataset. In view of the above, as used herein, the term "dataset" refers to one or more blocks of data that, in aggregate, represent one or more operating system volumes and that may be used (with some slight modification in some instances, as discussed later) to create such one or more operating system volumes on one or more operating system partitions.

Once a particular dataset has been selected by the secure bootloader to be used as the basis for creating one or more operating system volumes on one or more corresponding operating system partitions, the secure bootloader may cause the selected dataset to be authenticated. The authentication of the selected dataset and the creation of the one or more operating system volumes based on the selected dataset by the secure bootloader may be performed asynchronously or in tandem. For example, in some implementations, the secure bootloader may cause the selected dataset to be authenticated, and may only start creating the one or more operating system volumes on the corresponding one or more operating system partitions from the selected dataset after the selected dataset is authenticated by the secure bootloader. In other implementations, the secure bootloader may cause the one or more operating system volumes to be created on the corresponding one or more operating system partitions from the selected dataset and may then, after such creation is completed, authenticate the one or more operating system volumes. In yet other implementations, the creation of the one or more operating system volumes on the corresponding one or more operating system partitions based on the selected dataset may occur generally contemporaneously with the authentication of the selected dataset. This latter approach is more computationally efficient compared to the previous two approaches, and is thus preferable—although all such approaches are considered within the scope of this disclosure.

For example, in some implementations, the secure bootloader may cause the selected dataset (or portions thereof) to be copied, byte-for-byte, to one or more operating system partitions to create a corresponding one or more operating system volumes. For example, the first ~100 megabytes of the selected dataset may be copied byte-for-byte to a first operating system partition to create a first operating system volume, and the next ~15 gigabytes of the selected dataset may be copied byte-for-byte to a second operating system volume, both of which together may contain a Windows 10® operating system (the first operating system volume, in this example, may be equivalent to the system volume of Windows 10®, and the second operating system volume may be equivalent to the boot volume of Windows 10®).

The secure bootloader may simultaneously process the dataset according to a set of one or more hashing operations as the data from the selected dataset is copied to produce an associated test hash value that may then, at the conclusion of the copying process and in order to authenticate the dataset, be checked against a reference hash value that was previously generated by subjecting a "reference" copy of the selected dataset, such as a reference dataset representing a certified one or more operating system volumes, to the same set of one or more hashing operations. In implementations where authenticity confirmation is desired, particularly those involving electronic gaming machines, the reference hash value may additionally be obtained in an encrypted form, e.g., such as may be supplied by a certification authority or other "gatekeeper entity," and then decrypted prior to being checked against the test hash value. If the test hash value and the reference hash value match, thereby indicating that the selected dataset is an authentic copy of the reference dataset, then the selected dataset (and thus the one or more operating system volumes created based thereupon) may be considered to be certified and the secure bootloader may then cause a kernel stored in one or more of the operating system volumes to be executed. In some implementations, the reference hash values may be digitally signed and verified by a corresponding signature key. If the test hash value and the reference hash value do not match, the authentication may fail and the secure bootloader may cause the kernel stored in the one or more operating system volumes to not execute and may, in some implementations, cause additional measures to be taken, such as, for example, one or more of: a) generation of one or more error messages to an operator of the electronic gaming machine, b) repetition of the authentication process (and, if performed concurrently with or prior to the authentication process, the operating system volume creation process) one or more times, c) selection of a different dataset followed by an attempt to authenticate that other dataset, creation of one or more operating system volumes based on that other dataset, and execution of an operating system kernel in the one or more operating system volumes created based on the other dataset if such authentication is successful, d) deletion of the one or more operating system volumes created using that dataset, and/or e) deletion of the selected dataset from the shadow partition (thereby preventing the possibility of further re-attempts at using that dataset).

In systems where the creation of the one or more operating system volumes based on the selected dataset and the authentication of that selected dataset are performed concurrently, each byte of data in the dataset would generally only need to be retrieved from a non-volatile storage device once for a given authentication/operating system volume creation process, as the test hash value may be calculated using the same data being copied. In systems where the one or more operating system volumes are created either before or after the determination of the test hash value, the entire selected dataset may need to be retrieved from non-volatile storage twice—once for the creation process, and then separately for the hashing process. Given the size of the datasets for many operating systems, such inefficiency may result in significantly longer boot times as compared with the concurrent approach.

In some implementations, an incremental hash approach may be adopted to provide for early detection of possibly non-authenticable datasets. For example, the set of one or more hashing operations used to create the test hash value (and the reference hash value, for that matter) may be incremental in nature, e.g., the set of one or more hashing operations may be performed on sequential portions of the dataset, and the hash value for each portion may be added to the hash value for the previous portion. In such implementations, at various stages during the copying of the selected dataset, the current test hash value that has been determined for the data processed thus far may be compared against a corresponding reference hash value for a putatively identical portion of the reference dataset; if the two hash values do not match, then this indicates that the selected dataset is different from the reference dataset, and no further checking of the rest of the dataset will be necessary.

In some implementations, the one or more datasets on the shadow partition may be deliberately altered as compared with the corresponding reference datasets for the purposes of storage on the shadow partitions, but may then be adjusted by the secure bootloader for authentication purposes and operating system volume creation purposes so that they again, in theory, match exactly with the corresponding reference dataset(s).

For example, in some implementations, it may be desirable to alter one or more bytes of data at the very start of each of each dataset to avoid the possibility that the operating system may recognize the dataset as a readable disk volume and attempt to manage that disk volume as it would with any other disk volume that the operating system manages. Generally speaking, a disk partition may include a signature located in the first few bytes of the partition that may indicate the type of file system used for the volume of that partition. Thus, if a dataset is located at the very start of the shadow partition and is a byte-for-byte copy of one or more operating system volumes, then the operating system may interpret the first few bytes of the dataset as indicating the file system signature of one of the operating system volumes represented by the dataset and may manage it as it would if that operating system volume were instead located on the operating system partition, thereby potentially altering the dataset and making it impossible to authenticate. It may be possible to prevent this, for example, by shifting the location of the dataset so that it does not start at the very start of the shadow partition, but some modern operating systems, such as Windows 10®, may incorporate sophisticated boot diagnostics that may, as the operating system is brought online, scan partitions to look for such signatures in locations other than at the very start of the partition. Such utilities may, for example, be used to identify disk volumes where the disk partition table may have an error that causes an offset between the start of the disk partition and the start of the disk volume associated therewith. In such cases, such utilities may allow such errors to be identified and rectified in the disk partition table to avoid potentially overwriting part of the disk volume (if the disk volume starts or ends at a location outside of the disk partition) or wasting disk space (when the partition is larger than the disk volume). Regardless of the purpose of such utilities or diagnostics, they may operate to seek out such file system signatures, regardless of their particular location in the disk partition, and, if they find such signatures, manage the associated "disk volumes," which may, again, result in alteration of the dataset having such disk volumes and subsequent authentication failure of that dataset. Such issues are of particular concern for datasets that represent the one or more operating system volumes in a more-or-less unmodified state, e.g., byte-for-byte copies (if the dataset represents the one or more operating system volumes in a compressed state, then such compression may, as a side effect, hide or mask the file system signatures from the operating system's attempts to locate errant file systems).

To avoid such potential corruption of the datasets, the first few bytes of each dataset, or each portion of the data set that corresponds with the start of an operating disk volume represented by the dataset, may be modified in the dataset stored on the one or more shadow partitions as compared with the values of those bytes in the corresponding reference version of the dataset.

For example, the first four bytes of each dataset on the shadow partition may include data that indicates that the dataset is an NTFS®-formatted volume, which may cause the operating system to treat each such dataset as an NTFS® volume (and thus potentially alter portions of the datasets). By altering at least one of those bytes to cause the first four bytes of each dataset to indicate a file system type that is not recognized by the operating system, then the operating system can be caused to treat the dataset as a block of data that, for example, is of a format unknown to the operating system, which will cause the operating system to truly avoid modifying any part of those datasets. When one of the datasets is then selected by the secure bootloader, the secure bootloader may cause the first four bytes of the selected dataset to be adjusted such that they revert back to the state they would be in were the dataset to have been left unadjusted in the first place. Thus, for example, the first four bytes may be reverted to values that indicate that the first dataset is formatted as an NTFS® volume. Such reversion may be performed prior to performing the authentication of the first dataset, thereby ensuring that the dataset will authenticate properly. From a practical perspective, such adjustment will occur after the bytes to be adjusted have been loaded into volatile memory from the shadow partition for authentication and/or operating system volume creation purposes, although it is conceivable that the actual dataset as stored on the shadow partition itself could be modified to make such adjustments before being copied into volatile memory (doing so, however, may entail some risk that the adjusted portion of the dataset is recognized by an operating system utility/diagnostic, as discussed above).

In implementations where each dataset represents multiple operating system volumes, the dataset may include a corresponding number of file system signatures that are located at the start of each portion of the dataset that represents a different operating system volume. In such instances, it may be desirable to mask each such file system signature by altering the bytes where such signatures are located so that they are unrecognizable to the operating system, similar to the operations discussed above. The secure bootloader may be configured to then adjust the altered portions of the selected dataset to match the corresponding portions of the reference dataset prior to the authentication and/or system volume creation process.

Various aspects of examples of the above concepts are discussed in more detail below with reference to the accompanying Figures.

Figure 3:
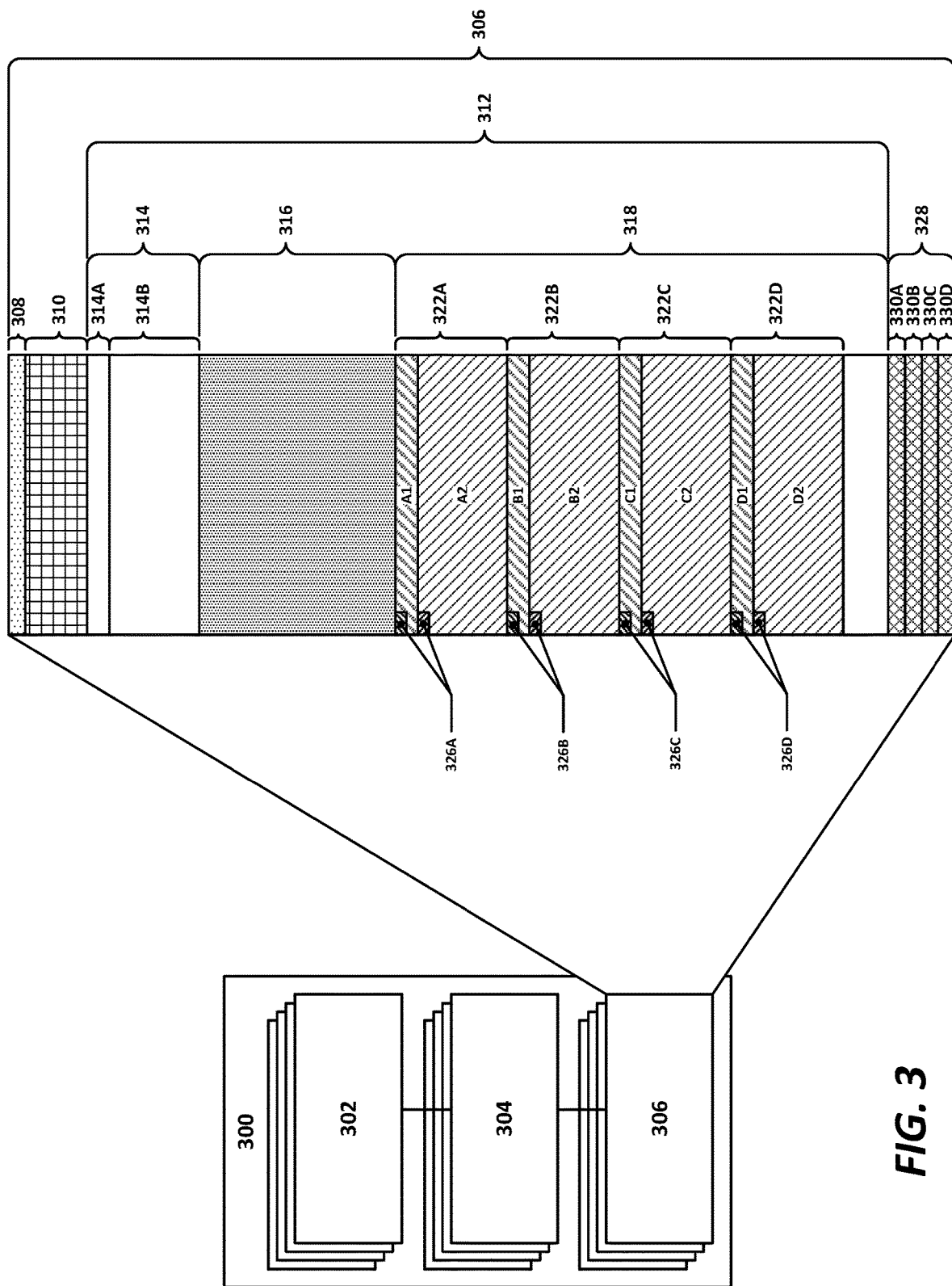
FIG. 3 depicts a diagram of an apparatus or system that may be used to implement the secure bootloaders discussed herein.

FIG. 3 depicts a diagram of an apparatus 300, which may, for example, be an electronic gaming machine, that has one or more processors 302, one or more volatile memory devices 304, and one or more non-volatile storage devices 306. The one or more processors 302 may, for example, include field-programmable gate arrays (FPGAs), application-specific circuits (ASICs), general-purpose central processing units (CPUs), graphical processing units (GPUs), digital signal processors (DSPs), microcontrollers, hardware accelerators, etc. In one or more implementations, processors 302 can be system-on-chips (SoCs). The one or more volatile memory devices may include, for example, random access memory (RAM), static RAM (SRAM), dynamic RAM (DRAM), etc. The one or more non-volatile storage devices may, for example, include hard drives, solid-state drives, network storage devices, USB hard drives, USB flash drives, ferroelectric RAM, flash memory, etc. The one or more processors 302, the one or more volatile memory devices 304, and the one or more non-volatile storage devices may be operably connected with one another such that the one or more processors may access data storage locations on the one or more volatile memory devices 304 and the one or more non-volatile storage devices 306, and the one or more non-volatile storage devices 306 may store computer-executable instructions which may be loaded into the one or more volatile memory devices and executed by the one or more processors 302 to cause the one or more processors 302 to take various actions.

While not shown in FIG. 3, the apparatus 300 may include various other components and/or peripherals, e.g., one or more graphics cards, communication interfaces (such as network adapters, wireless network adapters, input devices such as keyboards, mice, or other control devices, audio output devices, etc., depending on the particular implementation. In the context of electronic gaming machines, such an apparatus may be part of an electronic gaming machine as discussed earlier herein and as depicted in FIGS. 1 and 2.

In FIG. 3, the data storage area of one of the one or more non-volatile storage devices 306 is shown in shown in representative form on the right side of the Figure. The data storage area of the non-volatile storage device 306 may include multiple regions that are each allocated for storing different types of data. In this example, a master boot record (MBR), globally unique identifier (GUID) partition table, or other type of data structure that defines partitions on the non-volatile storage device 306 may be provided in region 308. Such a datastructure is typically positioned at the very start of the non-volatile storage device 306 that is designated by the apparatus's initial boot code as the boot disk. Thus, for example, when the apparatus 300 is turned on or rebooted, a BIOS, UEFI, EFI, or other type of firmware may initialize various systems in the apparatus and then read data indicating which non-volatile storage device is to be used as the "boot disk"; this initial boot code may then access the data in the region 308 to determine how the disk is partitioned and which partition contains the data and code needed to continue the boot process (this partition is usually referred to as the "active" partition, although some operating systems allow for such a partition to be differently identified).

In this particular example, a region 310 of the non-volatile storage device 306 is used to store the code for a secure bootloader such as the secure bootloaders discussed herein. The boot code that is loaded into the one or more volatile memory devices 304 and executed by the one or more processors 302 may, as part of its operation, load the secure bootloader stored in region 310 into the one or more volatile memory devices 304 and then cause the secure bootloader to be executed.

The disk partitioning information located in region 308 may define a plurality of disk partitions 312. In this example, there are four disk partitions total—two operating system partitions 314 (314A and 314B), a data partition 316, and a shadow partition 318. However, it will be recognized that different configurations of partitions may be used in other implementations, e.g., with greater or fewer numbers of partitions.

The one or more operating system partitions, which include two partitions in this example, may be used to store operating system-related files and may be used to store corresponding operating system volumes containing such files. In FIG. 3, the operating system partition 314A, may, for example, be used to eventually store a system volume for Windows 10®, and the operating system partition 314B, may, for example, be used to eventually store a boot volume for Windows 10®. Such partitions, may, in aggregate, be viewed as "one or more operating system partitions" (in this case, there are two) that are used to store the "operating system volumes" that store the code that the operating uses. In FIG. 3, the operating system partitions 314A and 314B are shown "empty," although in other implementations, they may have the corresponding one or more operating system volumes stored thereupon.

The data partition 316 may be used to store various application data files, e.g., files for software or programs that may be run by the operating system of the apparatus once booted, but which do not, in themselves, form part of the operating system. In some implementations, such data may nonetheless be included as part of the one or more operating system volumes, if desired, although this may be less efficient in the context of the operations discussed herein. There may also be multiple data partitions 316, if desired.

The shadow partition 318 may be used to store one or more datasets 322, such as datasets 322A, 322B, 322C, and 322D in this example. Each such dataset 322 may, as discussed earlier, represent one or more operating system volumes. In this example, each dataset 322 represents two operating system volumes, e.g., the dataset 322A represents two operating system volumes A1 and A2, the dataset 322B represents two operating system volumes B1 and B2, the dataset 322C represents two operating system volumes C1 and C2, and the dataset 322D represents two operating system volumes D1 and D2. In this example, the datasets 322 are essentially byte-for-byte copies of reference operating system volumes that have been certified by a certification authority, and each of the operating system volumes represented by each dataset is configured to fit within a corresponding one of the operating system partitions 314. For example, the operating system volumes A1, B1, C1, and D1 are each configured to fit within the operating system partition 314A, and the operating system volumes A2, B2, C2, and D2 are each configured to fit within the operating system partition 314B. Thus, any one of the datasets 322 may be used to create the operating system volumes of a corresponding operating system on the one or more operating system partitions 314. It should also be understood that while the shadow partition 318 is shown as a single partition, the shadow partition may instead be multiple shadow partitions, and such shadow partitions may, for example, reside on one or more non-volatile storage devices 306.

The shadow partition 318, as discussed earlier herein, may be assigned a partition type that will generally cause the operating system to avoid treating the partition as a system resource. For example, the shadow partition may be designated as a "recovery" partition type, which is generally used to store recovery files and is thus generally left alone by the operating system. Other partition types having similar effect may be used instead, if desired. Put another way, shadow partitions may be assigned a partition type that is "unallocated" to the operating system, i.e., a partition type that the operating system will not recognize as being freely available to the operating system for data-write operations (as discussed elsewhere herein, however, some operating systems may still access such unallocated partition types, e.g., if a partition of an unallocated partition type is formatted for use with a file system that the operating system recognizes as a file system (such as a dynamic file system) that is normally handled by that operating system, the operating system may still access that unallocated partition—in such cases, it may still leave the data on the partition represented by the files contained within that file system alone, but may still alter portions of such an unallocated partition that are used for management of the file system itself).

In the example of FIG. 3, while the datasets 322 are each essentially byte-for-byte copies of two operating system volumes, they are not exact replicas of those operating system volumes. In order to avoid having the datasets potentially be modified by the operating system, e.g., such as was discussed earlier with reference to various diagnostic routines that some modern operating systems may use, portions of each dataset corresponding with the first N bytes 326, e.g., 326A, 326B, 326C, and 326D, of each operating system volume A1, A2, B1, B2, C1, C2, D1, and D2 represented by the datasets 322 may be altered from the corresponding bytes in the reference version of those datasets. Such alteration may prevent the operating system from potentially recognizing file systems within the datasets and then managing those file systems (which may cause the datasets to change and then fail authentication).

The non-volatile storage device 306 may also store corresponding digital signatures 328, each of which may correspond with one of the datasets 322. Each digital signature 328 may, for example, include one or more reference hash values 330, e.g., reference hash values 330A, 330B, 330C, and 330D. Such reference hash values may be stored in locations that are easily locatable by the secure bootloader so that the corresponding one or more hash values 330 for a given dataset 322 may be located by the secure bootloader and retrieved in order to authenticate that dataset 322 during the boot process. In this example, a fixed-size region of the non-volatile storage device 306 located at the "end" of the disk has been dedicated to storing such digital signature information, which allows the secure bootloader to reliably access that digital signature information during the boot process since the locations of such data may be indexed based on the offset of each piece of information from the end of the non-volatile storage device 306, making it relatively simple for the secure bootloader to retrieve.

It will be understood that the digital signatures 328 may be stored in any number of locations, e.g., within the shadow partition 318 itself, on a separate partition, or even on another non-volatile storage device accessible to the one or more processors 302. In some implementations, the digital signatures 328 may be stored remotely and provided to the secure bootloader via a network connection or other communications interface when needed. The same may be done with the entire shadow partition 318, if desired, although given the sizes of the datasets 322 that would be required to represent most modern operating systems, e.g., 15 GB to 20 GB, network retrieval of such datasets 322 would incur a much lengthier delay during boot-up than that associated with using a local instance of the dataset 322 stored on the apparatus 300.

Figure 4:
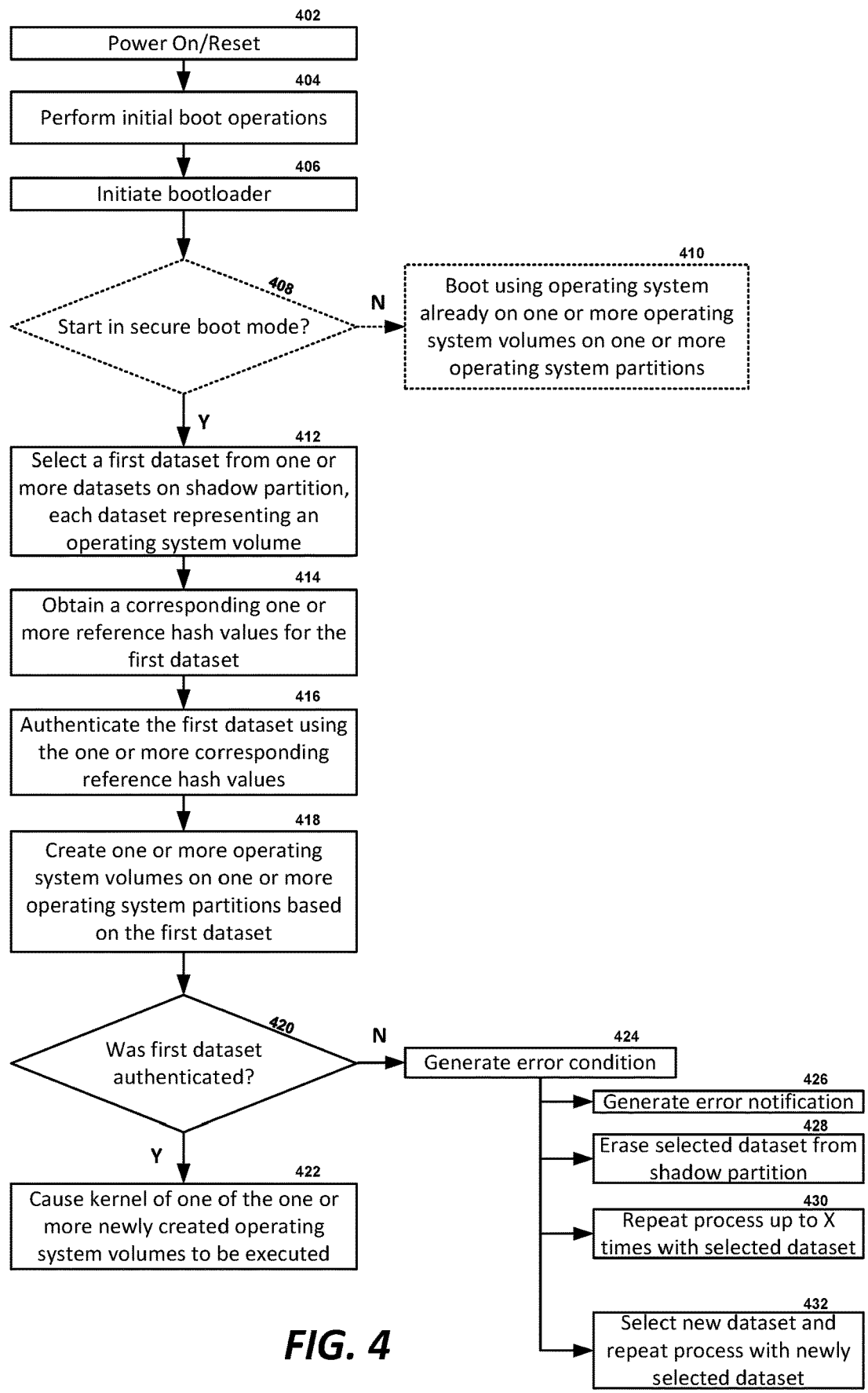
FIG. 4 depicts a flow chart of example secure boot mode operations.

As discussed earlier, a system such as that shown in FIG. 3 may be used to implement a secure boot mode that may provide for a certifiable, modern operating system to be used. FIG. 4 depicts a flow chart of an example such secure boot mode operations. In block 402, the operations may begin with the initialization of the boot process, e.g., through turning on the power to the apparatus 300 or by resetting the apparatus 300 (or any other mechanism).

In block 404, various initial boot operations may be performed, e.g., execution of BIOS, EUFI, EFI, or other routines that serve to perform the initial configuration and setup for the apparatus 300 that occur prior to the execution of the secure bootloader; such initial boot operations may be performed, for example, by the one or more processors 302. In systems where a complete chain-of-trust is desired, i.e., where each portion of code executed by the one or more processors 302 is authenticated as being compliant (certified) before being executed, such initial boot operations may involve checking digital signatures of such code against a reference signature and only executing such code after it is verified as authentic based on the corresponding digital signature(s). Such initial boot operations may, include, for example, copying the secure bootloader that may be stored in region 310 into one or more volatile memory devices 304 and then, after the secure bootloader is authenticated (assuming that such authentication is performed), causing the secure bootloader to be executed in block 406.

In systems where there the secure bootloader is configured to be bootable into multiple modes, e.g., a secure boot mode and one or more other boot modes, block 408 may be executed, e.g., by the one or more processors 302, to determine if secure boot mode has been instructed. If not, then the operations may proceed to block 410, in which the system may be booted, e.g., by the one or more processors 302, in a manner that is not in accordance with the operations s discussed above, e.g., using the kernel of an operating system that is already stored on the one or more operating system volumes and that is not necessarily authenticated. If secure boot mode has been instructed in block 408, or if the secure bootloader is configured to only allow a secure boot mode, then the operations may proceed to block 412, in which the secure bootloader may be caused, e.g., by the one or more processors 302, to select one of the datasets 322 stored on the shadow partition for use during the boot process. After selecting the dataset 322, which is referred to in this example as the first dataset, a number of operations may be performed, e.g., by the one or more processors 302—some such operations may be performed in various orders and/or in parallel. For example, the operations may include, in block 414, obtaining, e.g., by the one or more processors 302, a corresponding one or more reference hash values for the first dataset, and then using those one or more reference hash values to authenticate the first dataset in block 416. As discussed earlier, such reference hash values may be stored in an encrypted state and may be decrypted by the secure bootloader using a public key of a public/private key pair prior to such authentication, thereby ensuring the provenance of the reference hash values. Prior to, subsequent to, or concurrently with such authentication, the operations may further include, in block 418, additionally causing one or more operating system volumes to be created, e.g., by the one or more processors 302, on the one or more operating system partitions 314 based on the first dataset (the creation of such operating system volumes may be omitted or curtailed if authentication is failed or there is otherwise an indication that the first dataset is compromised.

Subsequent to or concurrently with the authentication of the first dataset and the creation of the one or more operating system volumes based on the first dataset, a determination may be made in block 420, e.g., by the one or more processors 302, as to whether the first dataset is authentic, e.g., is the first dataset identical to a reference version of that dataset that has been certified by a certification authority based on the one or more reference hash values, each of which was created based on the reference version of the dataset. It will be understood that the operations discussed above with respect to FIG. 4 may be performed, for example, by the one or more processors 302.

Figure 5:
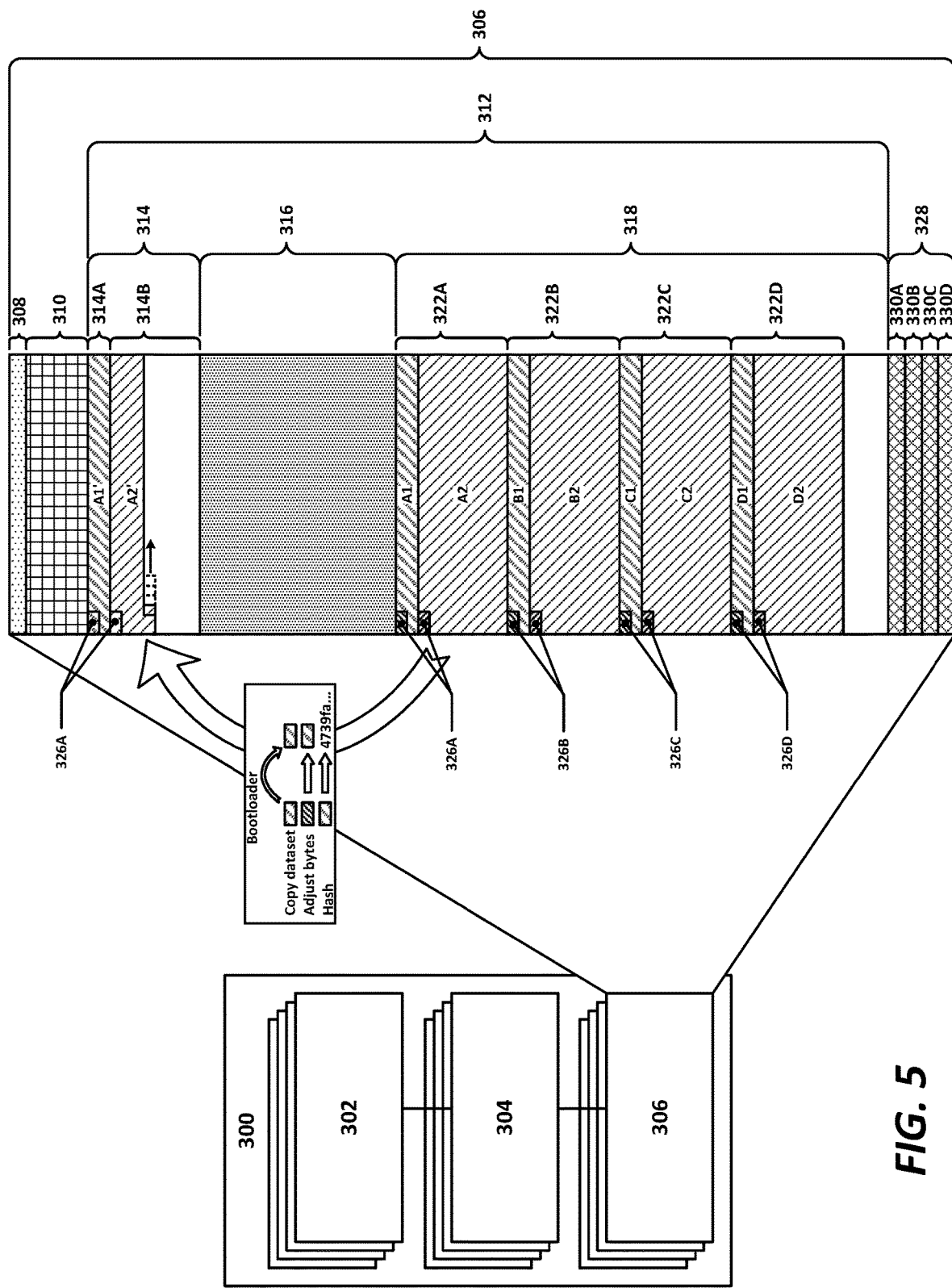
FIG. 5 depicts the system of FIG. 3, but showing the creation of the one or more boot volumes.

FIG. 5 depicts the system of FIG. 3 (and generally corresponds to block 418 of FIG. 4), but showing the creation of the one or more boot volumes, in this case, boot volumes A1' and A2', on the one or more operating system partitions, in this case, operating system partitions 314A and 314B, based on the dataset 322A. In this example, the secure bootloader is copying the dataset 322A to the one or more operating system partitions 314 in a byte-for-byte manner (it is approximately halfway through this process, as indicated by the dotted blocks of data and the horizontal arrow indicating sequentially written blocks of data). At generally the same time (or before such copying), the secure bootloader may adjust the first N bytes 326 of each portion of the dataset 322A that corresponds with the start of one of the operating system volumes, as discussed earlier, to cause the dataset 322 to match the corresponding reference dataset that was used to generate the corresponding one or more reference hash values 330A that will be used to then authenticate the dataset 322A. As can be seen, the adjustment of such N bytes is demonstrated graphically in the Figure by having the hatch pattern used to fill N bytes 326 match that of the remainder of the operating system volume, whereas the same N bytes in the datasets on the shadow partition 318 are hatched with a different hatch pattern to indicate that those N bytes are adjusted. The secure bootloader may also, during such copying, hash the dataset 322A (after the bytes 326 have been adjusted back to their intended values) to get one or more test hash values and then decide as to whether the dataset 322A is authentic based on such hash values.

Figure 6:
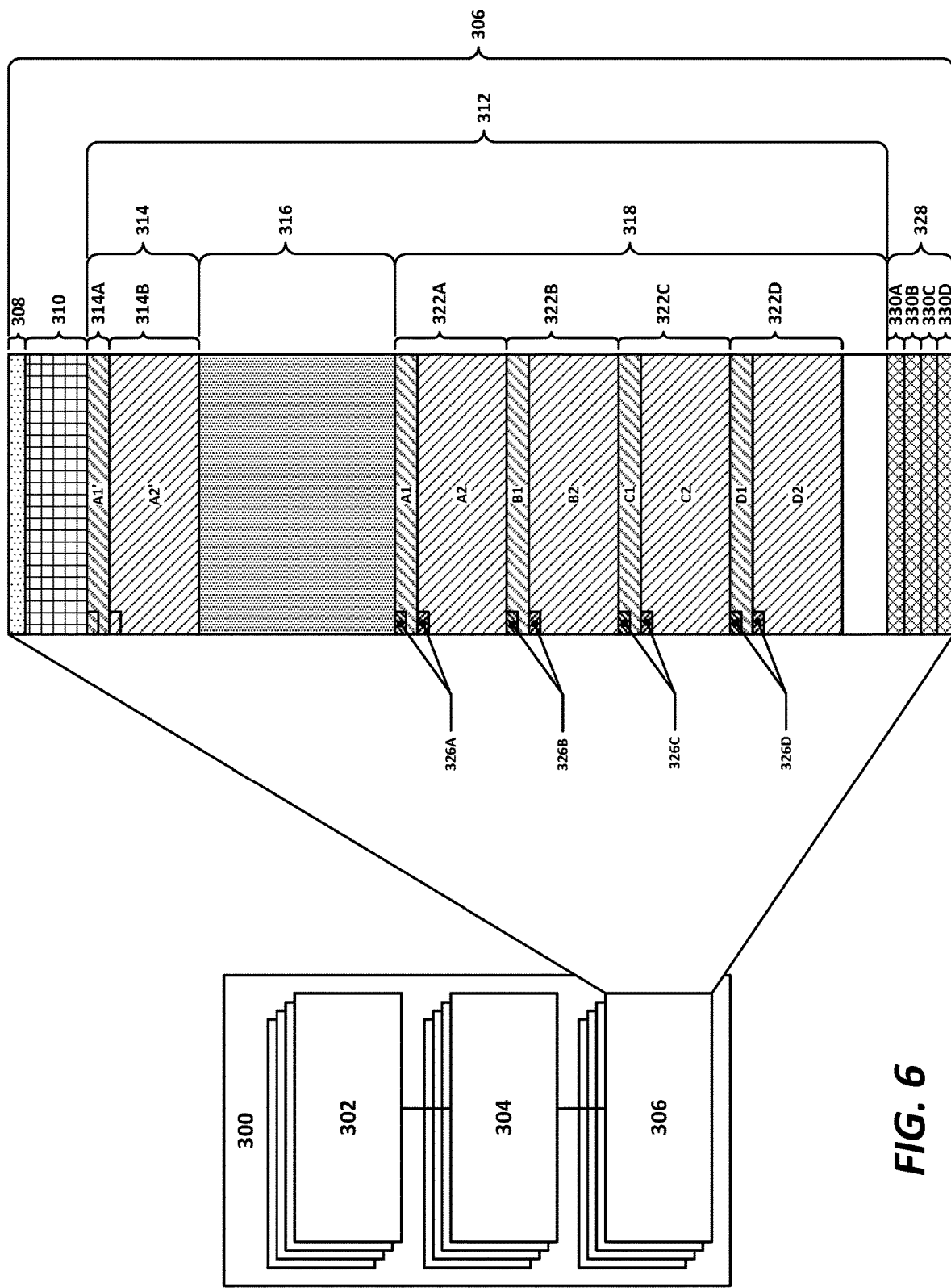
FIG. 6 depicts the system of FIGS. 3 and 5, but after the one or more operating system volumes have been created on the one or more operating system partitions.

FIG. 6 depicts the system of FIGS. 3 and 5, but after the one or more operating system volumes have been created on the one or more operating system partitions 314.

If it is determined, e.g., by the one or more processors 302, in block 420 that the first dataset is authentic, then the secure bootloader may proceed to cause a kernel of the operating system stored on the one or more operating system volumes to be loaded into the one or more volatile memory devices 304 and executed by the one or more processors 302 in block 422, thereby initializing the operation of the operating system. The operating system may then, if desired, perform further authentication on various other files, e.g., game files or other data stored on the data partition 316, for example.

If it is determined in block 420 that the first dataset is not authentic, then an error condition may be generated in block 424, e.g., by the one or more processors 302, and one or more subsequent actions may be taken. For example, an authentication failure may result in the secure bootloader providing, in block 426, one or more notifications to, for example, an operator of the apparatus 300, a certification or regulatory authority having oversight over the reference version of the first dataset and/or the apparatus itself, or any other desirable party. Alternatively or additionally, the secure bootloader may, in response to a failed authentication of the first dataset, cause the first dataset to be erased (or at least partially overwritten or otherwise caused to be skipped by the secure bootloader in further boot attempts) from the shadow partition in block 428 in order to prevent further attempts to utilize the first dataset. Another post-authentication-failure operation that may be implemented by the secure bootloader is, as shown in block 430, to make a limited number of attempts, e.g., three, to boot the apparatus using the first dataset before ceasing to try to boot using the first dataset before, for example, proceeding to attempt to use another dataset and/or pursuing the technique of block 426 or similar. Regardless of which operation or operations of blocks 426 through 430 are utilized by the secure bootloader, the secure bootloader may also implement an operation such as block 432, in which the secure bootloader selects a different dataset from the one or more datasets on the shadow partition (this assumes there are multiple such datasets present) and then attempts to boot using such an alternate dataset.

Figure 7:
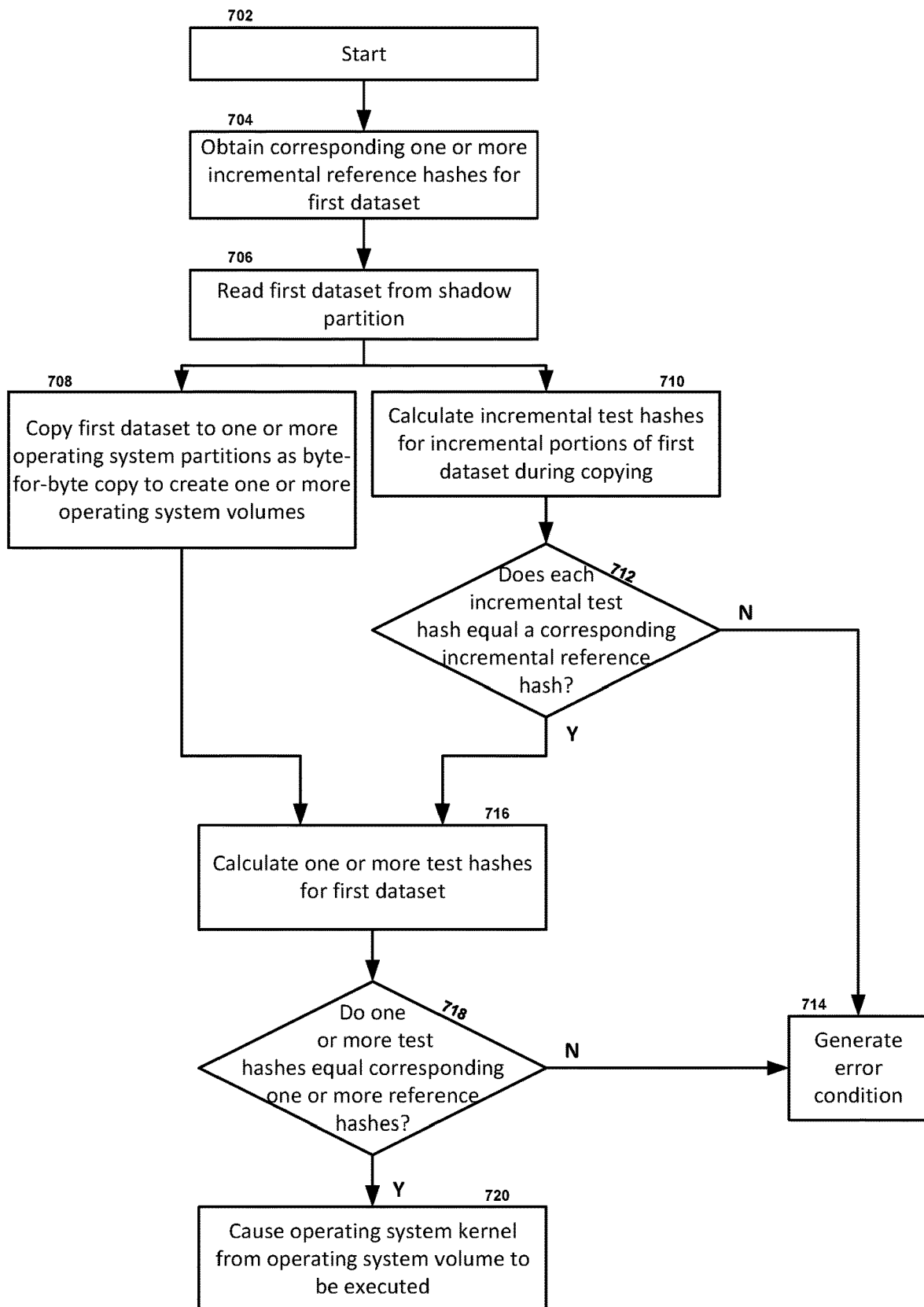
FIG. 7 depicts a flow diagram of operations for creating one or more operating system volumes according to a selected dataset.

FIG. 7 depicts a flow diagram of computer-implemented operations for creating one or more operating system volumes according to a selected dataset; FIG. 7 may be thought of generally as providing more detail on some potential implementations of portions of the operations of FIG. 4 (for example, blocks 704 through 716 provide further detail on one particular implementation of blocks 414 through 420 of FIG. 4, e.g., block 704 corresponds generally to block 414, blocks 710, 712, 716, and 718 correspond generally to blocks 414, 416, and 420, and block 708 corresponds generally to block 418). In these operations, the selected dataset may be incrementally hashed and validated, e.g., by the one or more processors 302, to allow for early detection of a non-authenticable dataset. In block 702, the operations may start, e.g., with the selection of a first dataset, e.g., by the one or more processors 302. In block 704, one or more incremental reference hashes for the first dataset may be obtained, e.g., by the one or more processors 302. Such reference hashes may, for example, be created by hashing incrementally larger portions, e.g., 100 MB, then 200 MB, then 300 MB, etc. of a reference version of the first dataset, e.g., a version that has been certified by a certification authority (the reference hashes would be hashed prior to being obtained by the gaming machine, as their purpose is to authenticate that the first dataset is authentic to a reference version of the first dataset). Alternatively, each such incremental hash may be for a discrete, successive portion of the first dataset, e.g., a first incremental hash for the first 100 MB of the first dataset, a second incremental hash for the next 100 MB of the first dataset, and so forth. Given the nature of hashes, however, each incremental hash will depend on all of the previous incremental hashes, as each hash builds further on the hash values of the portions hashed previously.

In block 706, the first dataset may be read, e.g., by the one or more processors 302, from the shadow partition in a manner that allows the first dataset to be hashed in a manner similar to that used to generate the one or more incremental reference hashes. While the first dataset is being read in block 706, one or more incremental test hashes may be generated, e.g., by the one or more processors 302, in block 710 in a manner similar to that used to generate the one or more incremental reference hashes. At the same time, the data read from the first dataset may be used, in block 708, to create one or more operating system volumes, e.g., as byte-for-byte copies, on one or more operating system partitions based on the first dataset. During this process, a determination may be made, e.g., by the one or more processors 302, in block 712 as to whether any of the calculated test hashes fails to authenticate, e.g., match, against the corresponding incremental reference hash. If an authentication failure occurs in block 712, then an error condition may be generated in block 714 and subsequent actions taken, as discussed previously with respect to blocks 426 through 432. The incremental reference hashes may be encrypted similar to the reference hashes used for final authentication, but in some implementations where true secure boot is desired the reference hashes may be left unencrypted since any compromise of the incremental reference hashes may be accounted for by the final authentication performed using an encrypted reference hash for the entire first dataset.

If authentication is determined to be valid in block 712, then the operations may proceed to block 716, where one or more test hash values may be calculated, e.g., by the one or more processors 302, for the first dataset. In some implementations, the last incremental test hash value (or one or more of them if multiple incremental test hash values are used at each incremental stage) may also be used as the one or more test hashes for the first dataset. In block 718, a determination may be made, e.g., by the one or more processors 302, as to whether the one or more test hash values for the first dataset match or otherwise authenticate the first dataset when evaluated against one or more corresponding reference hash values that were the product of hashing a reference version of the first dataset using the same set of one or more hashing operations used to generate the test hash values. In some implementations where incremental hashing is performed, the one or more incremental reference hash values that are used may include the final one or more reference hash values—in such implementations, the final one or more reference hash values used to perform overall authentication of the first dataset may be encrypted if it is desired to provide the ability to verify the provenance of the first dataset (although the other incremental reference hash values may be stored in unencrypted form, if desired). Any of a variety of hashing operations may be used, depending on various factors (e.g., the computational load required to perform the hash, the degree of uniqueness of the hash, the speed with which the hash may be calculated, etc.), in the techniques and operations discussed herein, including, for example, cryptographic hashes, such as SHA-1, SHA-2, SHA-3, etc.

If it is determined in block 718 that the first dataset is authentic, then the operations may proceed to block 720, in which the secure bootloader may cause an operating system kernel located on one of the one or more newly created operating system volumes on the one or more operating system partitions to be loaded into memory and executed by one or more processors, e.g., by the one or more processors 302. Conversely, if it is determined in block 718 that authentication has failed, then the operations may proceed to block 714 where an error condition may be generated. It will be understood that the operations discussed above with respect to FIG. 7 may be performed, for example, by the one or more processors 302.

It will be understood that the above principles and concepts may be implemented in a number of ways, all of which are considered to be within the scope of this disclosure. For example, while digital signing/authentication is used in the examples herein to provide assurance of the provenance of the datasets in question, it would also be possible to achieve such assurance by providing the entire dataset in encrypted form, in which case the mere act of decrypting it would provide the desired assurance that the dataset was the same dataset that was encrypted (or an exact copy thereof). For an operating system, this would likely take a prohibitively long period of time, e.g., likely hours, and would not be desirable in an electronic gaming machine context (or in various other contexts, for that matter). However, it is possible that some implementations may feature such a paradigm, especially if advances in processing speed and decryption algorithm reduce the time needed to decrypt such a large dataset. Another possible implementation may involve datasets that are not, as discussed with respect to some earlier examples, byte-for-byte copies of system volumes. In such implementations, the secure bootloader would include an "unpacking" algorithm that would be able to translate a dataset into a corresponding system volume. For example, the datasets may represent one or more operating system volumes that have been subjected to a compression algorithm in order to reduce their on-disk storage size. Such a compression algorithm may, when executed for a given dataset, "unpack" the data in the dataset and write the data to one or more operating system partitions to create one or more operating system volumes. In some such scenarios, the compressed or packed dataset may be what is authenticated, whereas in other scenarios, the uncompressed or unpacked operating system volumes may be what are authenticated. If authentication to a certified version is required, then the hash values that are used for authentication must be taken based on a corresponding reference version of the data to be authenticated, e.g., if the compressed dataset is authenticated, then the reference hash values used should be generated based on a reference version of the compressed dataset as well. If one or more unpacked or uncompressed operating system volumes are what is authenticated, then the reference hash values used should be generated on a similarly unpacked or uncompressed set of one or more reference versions of the one or more operating system volumes.

One benefit of secure bootloaders such as are described herein is that they may be used to implement the ability to seamlessly update the operating system software for a computing device. For example, such apparatuses may be equipped with a utility that is launched by the operating system once the operating system kernel is running; the utility may be configured to receive notifications or communications over a communications connection, such as an Internet connection or a local network connection. The utility may be configured to check for new datasets with a remote source on a periodic basis or may be configured to receive new datasets from such a remote source automatically. When the utility receives such a new dataset, it may be configured to write that dataset to the shadow partition directly, i.e., in a way that bypasses the operating system's normal file handling processes. For example, the utility may perform direct write operations to sectors of a mass storage device or other non-volatile storage device without making use of the file system provided by the operating system. In such a system, the utility may be provided with information that allows it to know where the shadow partitions on a non-volatile storage device or devices will be located (for example, such systems may be configured such that the last ~40 GB of a particular non-volatile storage device are designated as shadow partitions; such systems may be further configured such that information defining where each dataset is located within the shadow partition is locatable at a predefined location within the shadow partition(s), e.g., at the start of such a shadow partition), and the utility may be configured to read data directly from the shadow partition (without using the operating system file system) to obtain the information identifying where each dataset is located within the shadow partition and then select a location, based on that information, in the shadow partition that is to receive the new dataset (for example, the new dataset may be written to a portion of the shadow partition that does not have an existing dataset stored therein, or the new dataset may be written to a location that contains an old dataset, thereby overwriting it). The utility may then update the information stored in the shadow partition or partitions that identifies the locations of each dataset within the shadow partition or partitions with new information that reflects the newly added dataset. The utility may also receive a corresponding one or more reference hashes (and/or decryption keys) related to that dataset, as well as other related data, such as a date associated with the dataset, and may store that information on the shadow partition (or another location) as well. In some implementations, the utility may, as it writes the new dataset to the shadow partition, determine one or more test hashes of the new dataset and then, at the conclusion of such writing, compare the resulting one or more test hashes against the one or more reference hashes that it also receives in order to perform a "test" authentication—if the dataset is authentic, then the utility may retain it and may even take other actions, such as initiating a re-boot of the apparatus so that the new dataset may be selected by the secure bootloader and the operating system kernel from one of the one or more operating system volumes represented by the new dataset caused to be loaded during the next boot process. If the new dataset fails authentication, then the utility may cause the newly created copy of the new dataset on the one or more shadow partitions to be deleted or unable to be selected by the secure bootloader during the boot process. The benefit to such a utility is that it may run in the background to gradually download a new dataset and then writes it to the shadow partition directly, without providing the operating system the ability to choose where to place the data on disk, which prevents the operating system from inadvertently modifying any part of the new dataset.

It will be understood that the hash values discussed herein may be produced using any suitable hashing operations. For example, an entire dataset may be hashed according to a single hashing operation or according to some more complex set of hashing operations, e.g., two different hashes of the same dataset may be generated according to two different hashing techniques, or the dataset may be split into multiple portions, with each portion separately hashed to produce a corresponding hash value.

It will be understood that the various techniques or operations discussed herein are not intended to suggest a particular order of operations unless an order of operations is inherent in the various stages of the techniques or operations discussed. For example, if a technique includes a first operation that produces a result that is required for a second operation to be performed, then the first operation would necessarily need to be performed prior to the second operation. However, if the first operation is merely shown earlier in a process diagram than the second operation, but there is no actual dependency between the first operation and the second operation, then it will be understood that, generally speaking, the first operation and the second operation may be performed in any order. Similarly, ordinal indicators, e.g., (a), (b), (c), etc., and arrows shown in the Figures used herein are used, unless otherwise indicated (either explicitly or inherently), to facilitate organization and for clarity; they are not intended to, and should not be understood to, necessarily convey a particular order or sequence of events. It will also be understood that the various operations discussed herein may be performed in manners other than as discussed. For example, various operations, in some implementations, may be combined into a lesser number of distinct operations (for example, as discussed earlier, hashing of an operating system dataset may occur after the operating system dataset is copied to the operating system partition, e.g., as a separate operation after the copying is finished, or may, alternatively, be performed as the operating system dataset is copied, e.g., as a combined operation) or may be split apart into a greater number of operations; all such permutations are considered within the scope of this disclosure.

In this disclosure, the phrase "corresponds with" is used, in some instances, to refer to data that corresponds with other data. For example, portions of a dataset may "correspond with" portions of a reference version of that dataset. It will be understood that "corresponds with" does not necessarily require that the two items that correspond with one another be identical. For example, a dataset and a reference dataset may both include respective portions that represent a particular operating system volume, and those two portions may thus be said to correspond with one another. However, there may be slight (or even major) differences between those two portions that would cause the portion of dataset to fail to authenticate based when authenticated based on the corresponding portion of the reference dataset.

It is to be understood that the phrases "for each <item> of the one or more <items>," "each <item> of the one or more <items>," or the like, if used herein, should be understood to be inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

While the invention has been described with respect to the Figures, it will be appreciated that many modifications and changes may be made by those skilled in the art without departing from the spirit of the invention. Any variation and derivation from the above description and Figures are included in the scope of the present invention as defined by the claims.

What is claimed is:

1. An apparatus comprising:
one or more processors;
one or more memory devices; and
one or more non-volatile storage devices having at least two partitions wherein at least one operating system dataset representing a corresponding set of one or more operating system volumes is stored on one or more first partitions of the at least two partitions,
wherein the one or more non-volatile storage devices further store a bootloader configured to cause the one or more processors to:
  a) obtain one or more reference hash values for a first operating system dataset stored on one of the non-volatile storage devices,
  b) authenticate the first operating system dataset using the one or more reference hash values,
  c) create, using the first operating system dataset, an operating system volume on a second partition of the at least two partitions, and
  d) cause a kernel of a first operating system to be loaded into the one or more memory devices from the operating system volume and to be executed by the one or more processors responsive, at least in part, to a successful authentication of the first operating system dataset.

2. The apparatus of claim 1, wherein the bootloader is configured to cause the one or more processors to perform at least (b) through (d) every time the apparatus is booted.

3. The apparatus of claim 1, wherein the apparatus further comprises:
one or more displays;
a credit input device; and
one or more player-input devices, wherein:
  the one or more displays, the credit input device, and the one or more player-input devices are operably connected with the one or more processors and the one or more memory devices, and
  the one or more non-volatile storage devices further store instructions for controlling the one or more processors to cause a wagering game to be displayed on the one or more displays after the kernel of the first operating system is executed.

4. The apparatus of claim 1, wherein:
the one or more reference hash values result from hashing a reference version of the first operating system dataset according to a first set of one or more hashing operations; and
the bootloader is further configured to cause the one or more processors to:
  obtain the one or more reference hash values in (a) in an encrypted state, and
  authenticate the first operating system dataset using the one or more reference hash values in (b) by:
    decrypting the one or more reference hash values from the encrypted state to obtain the one or more reference hash values,
    obtaining one or more test hash values by hashing the first operating system dataset according to the first set of one or more hashing operations, and
    determining, based on the one or more test hash values and the one or more reference hash values, that the first operating system dataset matches the reference version of the first operating system dataset.

5. The apparatus of claim 4, wherein:
the first operating system dataset includes at least a first portion corresponding to a first operating system volume of the one or more operating system volumes that the first operating system dataset represents;
the reference version of the first operating system dataset includes at least a first reference portion corresponding to the first portion;
the first portion is a byte-for-byte copy of the first reference portion except that one or more bytes of the first N−1 bytes of the first portion differs from one or more bytes of the first N−1 bytes of the first reference portion; and the bootloader is further configured to cause, prior to or during (b) or (c), the one or more processors to adjust the first N−1 bytes of each first portion to match the first N−1 bytes of the corresponding first reference portion such that the authentication in (b) takes into account the adjusted first N−1 bytes of each first portion.

6. The apparatus of claim 5, wherein the first operating system volume is formatted such that the first N−1 bytes of the operating system volume indicate that that first operating system volume is formatted as a Microsoft® New Technology File System (NTFS®) volume and the first N−1 bytes of the first portion do not indicate formatting as a Microsoft® NTFS® volume.

7. The apparatus of claim 6, wherein N=5.

8. The apparatus of claim 5, wherein the bootloader is further configured to cause the one or more processors to cause, as part of (c), the adjusted first N−1 bytes of the first portion and then the Nth byte through the last byte of the first portion to be serially copied byte-for-byte to one of the second partitions.

9. The apparatus of claim 8, wherein the bootloader is further configured to cause the one or more processors to:
incrementally generate incremental test hash values of the adjusted first N−1 bytes of the first portion and the Nth byte through the last byte of the first portion during the copying of the adjusted first N−1 bytes of the first portion and the Nth byte through the last byte of the first portion;
obtain one or more incremental reference hash values, each incremental reference hash value corresponding to one of the one or more incremental test hash values and resulting from hashing a portion of the reference version of the first operating system dataset corresponding with the portion of the adjusted first N−1 bytes of the first portion and the Nth byte through the last byte of the first portion used to generate the corresponding incremental test hash value;
compare each incremental reference hash value to the corresponding incremental test hash value; and
generate an error condition if any one of the one or more incremental reference hash values and the corresponding incremental test hash value of the one or more incremental test hash values indicates an authentication failure.

10. The apparatus of claim 4, wherein each of the one or more reference hash values is encrypted using a private key of a corresponding public/private key pair and the bootloader is further configured to cause each of the one or more reference hash values to be decrypted with the corresponding public key of the corresponding public/private key pair.

11. The apparatus of claim 1, wherein:
there is a plurality of operating system datasets stored on the one or more first partitions,
the plurality of operating system datasets includes the first operating system dataset,
each operating system dataset is associated with data indicating a date associated with that operating system dataset,
the first operating system data set is associated with data indicating a first date that is more recent than the dates indicated by the data associated with the other operating system datasets of the plurality of operating system datasets, and
the bootloader is configured to select the first operating system dataset to perform (a) through (d) based on the first date being more recent than the dates indicated by the data associated with the other operating system datasets of the plurality of operating system datasets.

12. The apparatus of claim 1, wherein:
there is a plurality of operating system datasets stored on the one or more first partitions,
the plurality of operating system datasets includes the first operating system dataset,
each operating system dataset is associated with data indicating a date associated with that operating system dataset, and
the bootloader is further configured to cause the one or more processors to:
select the first operating system dataset prior to (a) after unsuccessfully attempting one or more times to authenticate one or more other operating system datasets of the plurality of operating system datasets that are each, based on the date associated with each of the one or more other operating system datasets, newer than the first operating system dataset, and
attempt to authenticate, at least until one of the operating system datasets is successfully authenticated, each of the one or more other operating system datasets of the plurality of operating system datasets using one or more corresponding reference hash values for that operating system dataset and in a reverse chronological order based on the dates associated with each other operating system dataset of the one or more other operating system datasets.

13. The apparatus of claim 1, wherein the one or more first partitions are designated in one or more partition tables of the one or more non-volatile storage devices as being a partition type that is an unallocated partition type for the first operating system.

14. The apparatus of claim 1, wherein the one or more first partitions are designated in one or more partition tables of the one or more non-volatile storage devices as being hidden partitions that are not visible to a file system of the first operating system.

15. The apparatus of claim 1, wherein the one or more operating system datasets includes at least one operating system dataset that represents one or more operating system volumes for a version of Microsoft® Windows®.

16. The apparatus of claim 15, wherein the one or more operating system datasets includes at least one operating system dataset that represents one or more operating system volumes for Microsoft® Windows 10®.

17. The apparatus of claim 1, wherein the one or more operating system datasets includes at least one operating system dataset that represents one or more operating system volumes for an operating system that modifies the second partition during execution.

18. The apparatus of claim 1, wherein the one or more storage devices further store one or more computer-executable instructions that are further configured to:
be executable by the kernel of the first operating system; and
cause the one or more processors to:
obtain an additional operating system dataset representing an additional corresponding one or more operating system volumes via a network connection,
obtain a corresponding one or more additional reference hash values for the additional operating system dataset, and
store the additional operating system dataset in the one or more first partitions.

19. A method comprising:
a) obtaining, by one or more processors, one or more reference hash values for a first operating system dataset stored on one or more first partitions of one or more non-volatile storage devices having at least two partitions;
b) authenticating, by the one or more processors, the first operating system dataset using the one or more reference hash values;
c) creating, using the first operating system dataset and by the one or more processors, an operating system volume on a second partition of the at least two partitions; and
d) causing a kernel of a first operating system to be loaded into the one or more memory devices from the operating system volume by the one or more processors and to be executed by the one or more processors responsive, at least in part, to a successful authentication of the first operating system dataset.

20. A non-transitory, machine-readable storage medium storing machine-readable instructions for a bootloader which, when executed by one or more processors of an apparatus having i) one or more non-volatile storage devices having at least two partitions and ii) one or more memory devices, cause the one or more processors to:
a) obtain one or more reference hash values for a first operating system dataset stored on one or more first partitions of the at least two partitions;
b) authenticate the first operating system dataset using the one or more reference hash values;
c) create, using the first operating system dataset, an operating system volume on a second partition of the at least two partitions; and
d) cause a kernel of a first operating system to be loaded into the one or more memory devices from the operating system volume and to be executed by the one or more processors responsive, at least in part, to a successful authentication of the first operating system dataset.

* * * * *